US010959206B2

(12) United States Patent
Islam et al.

(10) Patent No.: US 10,959,206 B2
(45) Date of Patent: Mar. 23, 2021

(54) CONVEYING PAGING GROUP INFORMATION THROUGH CONTROL CHANNEL TRANSMISSIONS

(71) Applicant: QUALCOMM Incorporated, San Diego, CA (US)

(72) Inventors: Muhammad Nazmul Islam, Edison, NJ (US); Tao Luo, San Diego, CA (US); Karl Georg Hampel, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,193

(22) Filed: Sep. 19, 2017

(65) Prior Publication Data
US 2018/0199310 A1  Jul. 12, 2018

Related U.S. Application Data

(60) Provisional application No. 62/476,565, filed on Mar. 24, 2017, provisional application No. 62/444,258, filed on Jan. 9, 2017.

(51) Int. Cl.
*H04W 68/02* (2009.01)
*H04W 24/08* (2009.01)
(Continued)

(52) U.S. Cl.
CPC ........... *H04W 68/02* (2013.01); *H04L 5/0053* (2013.01); *H04W 24/08* (2013.01);
(Continued)

(58) Field of Classification Search
CPC combination set(s) only.
See application file for complete search history.

(56) References Cited

U.S. PATENT DOCUMENTS

2007/0064669 A1* 3/2007 Classon ............... H04L 1/1822
370/347
2007/0259675 A1* 11/2007 Worrall ............... H04W 68/00
455/458

(Continued)

FOREIGN PATENT DOCUMENTS

WO    WO-2016172932 A1    11/2016

OTHER PUBLICATIONS

Ericsson: "Means and Configuration of Paging Delivery in NR", 3GPP Draft; R2-1700550—Means and Configuration of Paging Delivery in NR, 3rd Generation Partnership Project (3GPP), Mobile Competence Centre; 650, Route Des Lucioles; F-06921 Sophia-Anti Polls Cedex; France, vol. RAN WG2, No. Spokane, USA; Jan. 17, 2017-Jan. 19, 2017 Jan. 7, 2017, XP051204088, Retrieved from the Internet: URL:http://www.3gpp.org/ftp/tsgran/WG2_RL2/TSGR2_AHs/2017_01_NR/Docs/ [retrieved on Jan. 7, 2017], 3 pages.

(Continued)

*Primary Examiner* — Steven S Kelley
(74) *Attorney, Agent, or Firm* — Holland & Hart LLP

(57) ABSTRACT

In a wireless communications system that supports directional communications (e.g., a millimeter wave (mmW) system), a base station and a user equipment (UE) may utilize directional transmissions during a paging procedure. In some cases, a base station may use beam sweeping to transmit a control channel, which may contain a paging group information. For example, the base station may configure the UE or a group of UEs to monitor for the paging group information over a set of time-frequency resources. A UE that receives the paging group information may determine transmission resources to monitor for a subsequent data channel transmission based at least in part on the identified paging group information. The base station may (Continued)

then transmit the paging information over the indicated transmission resources.

29 Claims, 15 Drawing Sheets

(51) Int. Cl.
    *H04W 72/04*     (2009.01)
    *H04W 56/00*     (2009.01)
    *H04W 76/28*     (2018.01)
    *H04L 5/00*     (2006.01)
    *H04W 88/02*     (2009.01)
    *H04W 16/28*     (2009.01)
    *H04W 88/08*     (2009.01)

(52) U.S. Cl.
    CPC ....... *H04W 56/001* (2013.01); *H04W 68/025* (2013.01); *H04W 72/044* (2013.01); *H04W 76/28* (2018.02); *H04L 5/0048* (2013.01); *H04W 16/28* (2013.01); *H04W 88/02* (2013.01); *H04W 88/08* (2013.01)

(56) References Cited

U.S. PATENT DOCUMENTS

| | | | |
|---|---|---|---|
| 2009/0154385 A1* | 6/2009 | Makhija | H04W 52/0229 370/311 |
| 2010/0222083 A1* | 9/2010 | Kazmi | H04W 68/02 455/458 |
| 2012/0327880 A1 | 12/2012 | Ahn et al. | |
| 2013/0155991 A1* | 6/2013 | Kazmi | H04W 72/0453 370/329 |
| 2014/0079036 A1* | 3/2014 | Montojo | H04W 68/025 370/336 |
| 2014/0128109 A1* | 5/2014 | Li | H04W 68/02 455/458 |
| 2014/0206370 A1 | 7/2014 | Worrall et al. | |
| 2016/0007371 A1 | 1/2016 | Pietraski et al. | |
| 2016/0309282 A1 | 10/2016 | Xu et al. | |
| 2017/0013628 A1 | 1/2017 | Kim et al. | |
| 2018/0026698 A1* | 1/2018 | Lee | H04B 7/0639 370/335 |
| 2018/0027522 A1* | 1/2018 | Lee | H04W 68/02 370/336 |

OTHER PUBLICATIONS

International Search Report and Written Opinion—PCT/US2017/069028—ISA/EPO—dated Mar. 22, 2018.
Nokia et al., "Paging in NR at HF Operation", 3GPP Draft; R2-1700062 Paging in NR at HF Operation, 3rd Generation Partnership Project (3GPP), Mobile Competence Centre; 650, Route Des Lucioles; F-06921 Sophia-Anti Polls Cedex; France, vol. RAN WG2, No. Spokane, USA; Jan. 17, 2017-Jan. 19, 2017 Jan. 6, 2017, XP051203613, Retrieved from the Internet: URL:http://www.3gpp.org/ftp/tsg_ran/WG2_RL2/TSGR2_AHs/2017_01_NR/Docs/ [retrieved on Jan. 6, 2017], 6 pages.

* cited by examiner

CONVEYING PAGING GROUP INFORMATION THROUGH CONTROL CHANNEL TRANSMISSIONS

CROSS REFERENCES

The present Application for Patent claims priority to U.S. Provisional Patent Application No. 62/476,565 by Islam, et al., entitled "Conveying Paging Group Information Through Control Channel Transmissions," filed Mar. 24, 2017, and to U.S. Provisional Patent Application No. 62/444,258 by Islam, et al., entitled "Conveying Paging Group Information Through Control Channel Transmissions," filed Jan. 9, 2017, each of which is assigned to the assignee hereof.

BACKGROUND

The following relates generally to wireless communication, and more specifically to conveying paging group information through control channel transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless systems, devices (e.g., base stations and UEs) may communicate using directional transmissions (e.g., beams), in which beamforming may be applied using multiple antenna elements to provide a beam in a particular direction. In some cases, a base station may be unaware of a particular location of a UE, such as when a gap in communications occurs while a UE is moving. When the base station does not know the direction in which to transmit to the UE, the base station may transmit to the UE by sweeping through a set of beams focused in different directions (e.g., and transmitting a duplicative signal or information on each of the beams). Additionally or alternatively, the base station may transmit on one beam (e.g., or a few beams), and the UE may sweep through a set of beams in an attempt to locate the beam or beams on which the base station is transmitting. That is, in some cases, both the base station and the UE may sweep through a set of beams to transmit and receive. However, sweeping through a set of beams may be costly in terms of time, power consumption, and system resources (e.g., especially for transmissions with a large payload). Improved techniques for transmitting paging information may be desired.

SUMMARY

The described techniques relate to improved methods, systems, devices, or apparatuses that support paging transmissions in systems that use directional communications. In a wireless communications system that supports directional communications (e.g., a millimeter wave (mmW) system), a base station and a UE may utilize directional transmissions during a paging procedure. In some cases, a base station may use beam sweeping to transmit a control channel, which may contain paging group information. For example, the base station (e.g., or some other suitable network entity) may configure the UE (e.g., or a group of UEs) to monitor for the paging group information over a set of time-frequency resources. A UE that receives the paging group information may determine transmission resources to monitor for a subsequent data channel transmission based at least in part on the identified paging group information. The base station may then transmit the paging information over the indicated transmission resources.

A method of wireless communication at a UE is described. The method may include identifying, for a paging group that includes the UE, a control channel monitoring configuration comprising a set of occasions for reception of a control channel transmission that is transmitted by a base station over a first set of beams, monitoring one or more occasions of the set of occasions for the control channel transmission, receiving the control channel transmission from the base station, the control channel transmission comprising paging group information for the paging group, and determining, based at least in part on the paging group information, transmission resources to monitor for a data channel transmission that includes paging information for at least one UE in the paging group.

An apparatus for wireless communication is described. The apparatus may include means for identifying, for a paging group that includes the apparatus, a control channel monitoring configuration comprising a set of occasions for reception of a control channel transmission that is transmitted by a base station over a first set of beams, means for monitoring one or more occasions of the set of occasions for the control channel transmission, means for receiving the control channel transmission from the base station, the control channel transmission comprising paging group information for the paging group, and means for determining, based at least in part on the paging group information, transmission resources to monitor for a data channel transmission that includes paging information for at least one UE in the paging group.

Another apparatus for wireless communication is described. The apparatus may include a processor, memory in electronic communication with the processor, and instructions stored in the memory. The instructions may be operable to cause the processor to identify, for a paging group that includes the apparatus, a control channel monitoring configuration comprising a set of occasions for reception of a control channel transmission that is transmitted by a base station over a first set of beams, monitor one or more occasions of the set of occasions for the control channel transmission, receive the control channel transmission from the base station, the control channel transmission comprising paging group information for the paging group, and determine, based at least in part on the paging group information, transmission resources to monitor for a data channel transmission that includes paging information for at least one UE in the paging group.

A non-transitory computer readable medium for wireless communication is described. The non-transitory computer-readable medium may include instructions operable to cause a processor to identify, for a paging group that includes the UE, a control channel monitoring configuration comprising a set of occasions for reception of a control channel transmission that is transmitted by a base station over a first set of beams, monitor one or more occasions of the set of occasions for the control channel transmission, receive the control channel transmission from the base station, the control channel transmission comprising paging group information for the paging group, and determine, based at least in part on the paging group information, transmission resources to monitor for a data channel transmission that includes paging information for at least one UE in the paging group.

Some examples of the method, apparatus, and non-transitory computer-readable medium described above may further include processes, features, means, or instructions for receiving at least one of the control channel monitoring configuration or the paging group information through a master information block (MIB), a system information block (SIB), a remaining minimum system information (RMSI), a physical downlink control channel (PDCCH), radio resource control (RRC) signaling, a handover message, or any combination thereof.

Some examples of the method, apparatus, and non-transitory computer-readable medium described above may further include processes, features, means, or instructions for identifying uplink resources for transmitting a paging response based at least in part on the received control channel transmission. Some examples of the method, apparatus, and non-transitory computer-readable medium described above may further include processes, features, means, or instructions for transmitting the paging response to the base station using the identified uplink resources.

In some examples of the method, apparatus, and non-transitory computer-readable medium described above, the paging response indicates a beam of the first set of beams used to transmit, by the base station, the control channel transmission.

Some examples of the method, apparatus, and non-transitory computer-readable medium described above may further include processes, features, means, or instructions for monitoring the transmission resources for the data channel transmission. Some examples of the method, apparatus, and non-transitory computer-readable medium described above may further include processes, features, means, or instructions for decoding one or more transmissions received on the monitored transmission resources, the one or more transmissions including the data channel transmission. Some examples of the method, apparatus, and non-transitory computer-readable medium described above may further include processes, features, means, or instructions for identifying a paging message in the data channel transmission.

Some examples of the method, apparatus, and non-transitory computer-readable medium described above may further include processes, features, means, or instructions for identifying that the paging message includes the paging information that may be directed to the UE. Some examples of the method, apparatus, and non-transitory computer-readable medium described above may further include processes, features, means, or instructions for communicating with the base station based at least in part on the paging message.

Some examples of the method, apparatus, and non-transitory computer-readable medium described above may further include processes, features, means, or instructions for operating in an idle mode based at least in part on identifying that the paging message does not include the paging information directed to the UE.

In some examples of the method, apparatus, and non-transitory computer-readable medium described above, a first occasion of the set of occasions may be contained in a first slot or a first mini-slot of a paging discontinuous reception (DRX) cycle, and wherein a second occasion of the set of occasions may be contained in a second slot or a second mini-slot of the paging DRX cycle.

In some examples of the method, apparatus, and non-transitory computer-readable medium described above, the data channel transmission further includes an indication of the paging group.

In some examples of the method, apparatus, and non-transitory computer-readable medium described above, the paging group information comprises a paging group identifier having a bit-length of 10 to 14 bits.

In some examples of the method, apparatus, and non-transitory computer-readable medium described above, the control channel transmission may be frequency division multiplexed or time division multiplexed with a synchronization signal transmission.

In some examples of the method, apparatus, and non-transitory computer-readable medium described above, the synchronization signal transmission comprises a primary synchronization signal (PSS), or a secondary synchronization signal (SSS), or a physical broadcast channel (PBCH), or a demodulation reference signal (DMRS), or a combination thereof.

In some examples of the method, apparatus, and non-transitory computer-readable medium described above, the paging group information comprises a single bit indicating whether to monitor the transmission resources for the data channel transmission.

A method of wireless communication is described. The method may include identifying a paging group that includes a plurality of UEs, wherein one or more UEs of the plurality of UEs are to receive paging information and transmitting a control channel transmission over a first set of beams, the control channel transmission comprising paging group information providing an indication of a data channel transmission to include the paging information for the one or more UEs.

An apparatus for wireless communication is described. The apparatus may include means for identifying a paging group that includes a plurality of UEs, wherein one or more UEs of the plurality of UEs are to receive paging information and means for transmitting a control channel transmission over a first set of beams, the control channel transmission comprising paging group information providing an indication of a data channel transmission to include the paging information for the one or more UEs.

Another apparatus for wireless communication is described. The apparatus may include a processor, memory in electronic communication with the processor, and instructions stored in the memory. The instructions may be operable to cause the processor to identify a paging group that includes a plurality of UEs, wherein one or more UEs of the plurality of UEs are to receive paging information and transmit a control channel transmission over a first set of beams, the control channel transmission comprising paging group information providing an indication of a data channel transmission to include the paging information for the one or more UEs.

A non-transitory computer readable medium for wireless communication is described. The non-transitory computer-readable medium may include instructions operable to cause a processor to identify a paging group that includes a plurality of UEs, wherein one or more UEs of the plurality of UEs are to receive paging information and transmit a control channel transmission over a first set of beams, the control channel transmission comprising paging group information providing an indication of a data channel transmission to include the paging information for the one or more UEs.

Some examples of the method, apparatus, and non-transitory computer-readable medium described above may further include processes, features, means, or instructions for transmitting, over one or more of the first set of beams, the data channel transmission that includes the paging information for the one or more UEs.

Some examples of the method, apparatus, and non-transitory computer-readable medium described above may further include processes, features, means, or instructions for identifying, for the paging group, a control channel monitoring configuration comprising a set of occasions for reception of the control channel transmission, wherein the control channel transmission may be transmitted based at least in part on the control channel monitoring configuration.

In some examples of the method, apparatus, and non-transitory computer-readable medium described above, a first occasion of the set of occasions may be contained in a first slot or a first mini-slot of a paging DRX cycle, and wherein a second occasion of the set of occasions may be contained in a second slot or a second mini-slot of the paging DRX cycle.

In some examples of the method, apparatus, and non-transitory computer-readable medium described above, one or more of the first set of beams may be selected to transmit the paging information to a set of directions associated with the one or more UEs.

Some examples of the method, apparatus, and non-transitory computer-readable medium described above may further include processes, features, means, or instructions for receiving, from a UE of the plurality of UEs, a paging response on a first resource of a set of transmission resources allocated for paging responses, wherein the paging response indicates a beam of the first set of beams associated with the UE.

Some examples of the method, apparatus, and non-transitory computer-readable medium described above may further include processes, features, means, or instructions for selecting one or more of the first set of beams to transmit the data channel transmission based at least in part on the indicated beam.

In some examples of the method, apparatus, and non-transitory computer-readable medium described above, the paging group information comprises an indication of transmission resources to be monitored by the one or more UEs for the data channel transmission that includes the paging information.

In some examples of the method, apparatus, and non-transitory computer-readable medium described above, the data channel transmission further includes an indicator of the paging group.

In some examples of the method, apparatus, and non-transitory computer-readable medium described above, one or more of the first set of beams may be selected to transmit the data channel transmission to the paging group and to a second paging group having a second plurality of UEs.

In some examples of the method, apparatus, and non-transitory computer-readable medium described above, the paging group information includes information indicating the paging group and the second paging group may be to monitor for the data channel transmission.

In some examples of the method, apparatus, and non-transitory computer-readable medium described above, the paging group information comprises a paging group identifier having a bit-length of 10 to 14 bits.

In some examples of the method, apparatus, and non-transitory computer-readable medium described above, the paging group information comprises a single bit indicating whether to monitor for the data channel transmission.

Some examples of the method, apparatus, and non-transitory computer-readable medium described above may further include processes, features, means, or instructions for frequencying division multiplexing or time division multiplexing the control channel transmission with a synchronization signal transmission.

In some examples of the method, apparatus, and non-transitory computer-readable medium described above, the synchronization signal transmission comprises a PSS, or a SSS, or a PBCH, or a DMRS, or a combination thereof.

DETAILED DESCRIPTION

Figure 1:
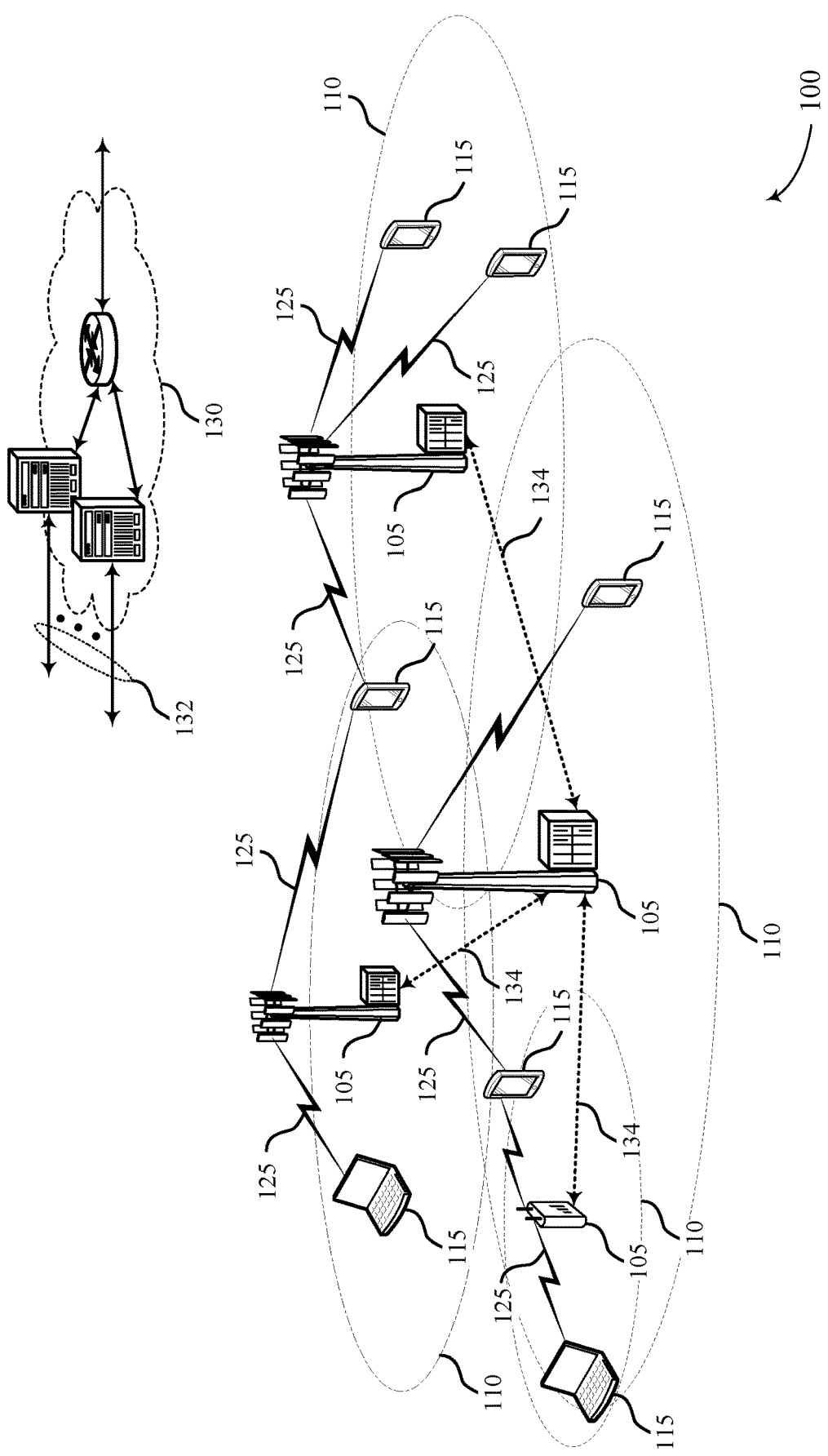
FIG. 1 illustrates an example of a system for wireless communication that supports conveying paging group information through control channel transmissions in accordance with aspects of the present disclosure.

In a wireless communications system, such as a new radio (NR) system, a base station and a UE may utilize directional beams for communications. In cases where a base station does not know a particular direction of a UE (e.g., because the UE may have moved while in an idle mode), the base station may not know a directional beam that may be used for transmissions to the UE. In such cases, the base station may transmit multiple directional beams in a beam sweeping manner in multiple different directions in order to enhance the likelihood that the UE will receive the transmission. In some examples, a base station may identify that a UE is to receive a paging transmission, but may be unaware of a particular directional beam to be used for transmissions to the UE. Such a base station may transmit a paging group indication using beam sweeping techniques.

For example, the base station may transmit a control channel transmission through a series of beams, where the control channel transmission indicates transmission resources to monitor for a subsequent data channel transmission that includes paging information. In some cases, the base station may identify a paging group that includes the one or more UEs that are to receive paging information. In some cases, multiple such paging groups may be identified (e.g., where the UEs of a given paging group may be disjoint from the UEs of another paging group). The base station may transmit (e.g., beamsweep) a control channel transmission that includes paging group information for the paging group, the paging group information providing an indication of a subsequent data channel transmission that is to be monitored by the UEs for the paging information. The base station may then transmit a shared channel transmission (e.g., over a directional beam or a set of directional beams) that includes paging information for the one or more UEs.

Such techniques may allow for a relatively small amount of data to be transmitted using beam sweep techniques, which may enhance the efficiency of a system. For example, the paging group information may include relatively few bits of information and thus use a relatively low amount of resources, which may be included, for example, in a synchronization signal broadcast or other broadcast channel that is provided using beam sweeping. Additionally or alternatively, the use of paging group information may enable the base station to selectively transmit paging information to a subset of UEs (e.g., such that each UE may not need to detect paging information for every other UE in the system), which may provide benefits to the wireless communications system (e.g., may improve a battery life of the UEs). Aspects of the disclosure are initially described in the context of a wireless communications system. Aspects of the disclosure are further illustrated by and described with reference to apparatus diagrams, system diagrams, and flowcharts that relate to conveying paging group information through control channel transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) Gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service.

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam, or directional beam, in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device, such as based station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples, a UE 115 and a base station 105 may use directional beams for communications. In some cases, to initiate a paging operation, the base station 105 may transmit paging group information on multiple directional beams in a beam sweeping manner to cover the directions in which a UE 115 may be located. For example, the base station 105 may identify, for a paging group including the UE 115, a control channel monitoring configuration including a set of occasions for transmission of a control channel transmission. The base station 105 may transmit the control channel transmission over a set of beams based at least in part on the control channel monitoring configuration. The UE 115 may monitor one or more occasions of the set of occasions for the control channel transmission. The UE 115 may receive the control channel transmission, which includes paging group information for the paging group including the UE 115. Subsequently (e.g., based on a paging response received from the UE 115), the base station 105 may transmit a directional data channel transmission that includes paging information for the UE 115 (e.g., or for another UE 115 in the paging group). The base station 105 may in some cases use beam sweeping to receive paging response transmissions from UEs 115 in different directions.

Figure 2:
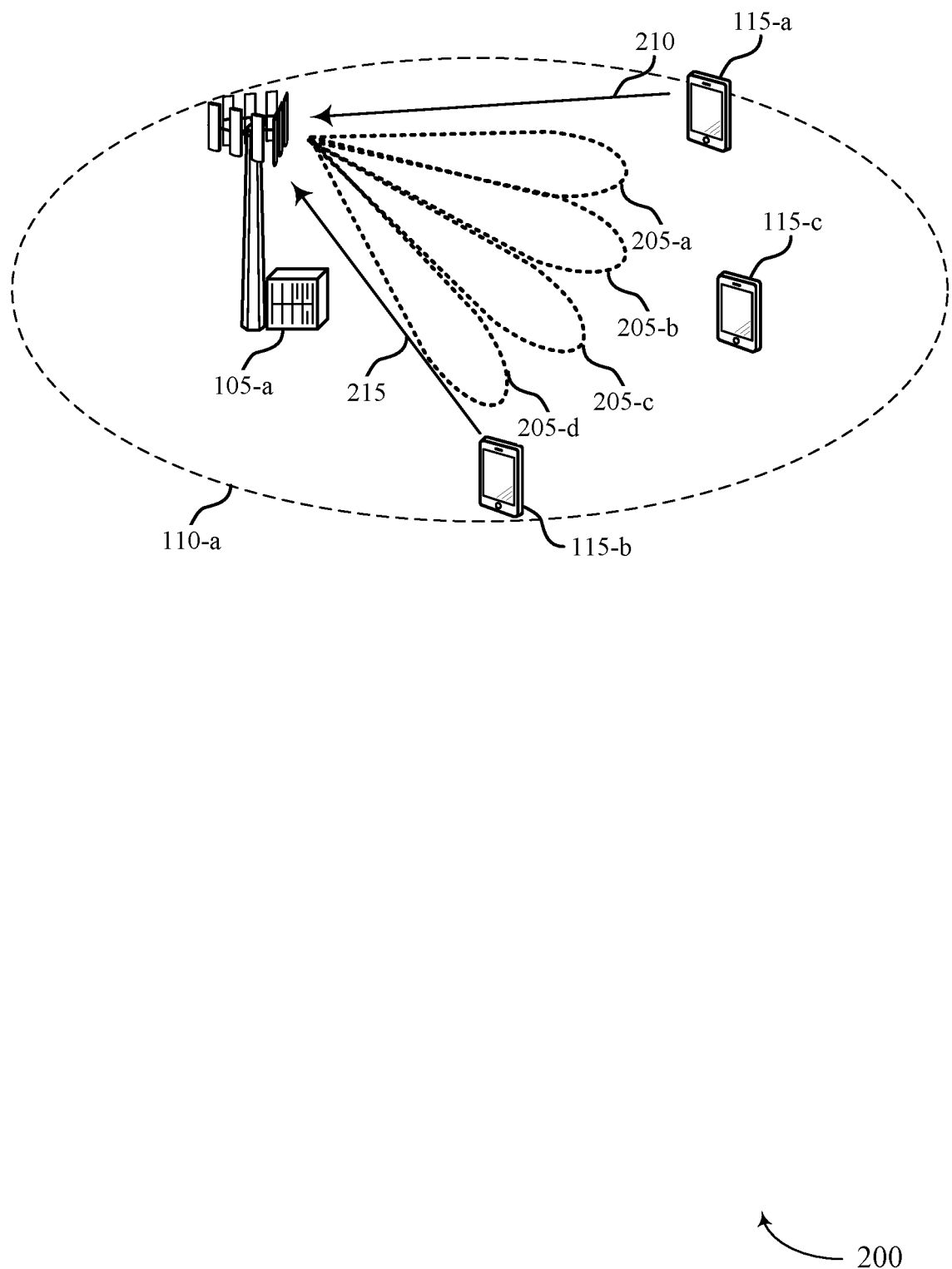
FIG. 2 illustrates an example of a system that supports conveying paging group information through control channel transmissions in accordance with aspects of the present disclosure.

FIG. 2 illustrates an example of a wireless communications system 200 for conveying paging group information through control channel transmissions. Wireless communications system 200 may include a first UE 115-*a*, second UE 115-*b*, a third UE 115-*c*, and a base station 105-*a*, each of which may be an example of the corresponding device described with reference to FIG. 1.

Wireless communications system 200 may support beamforming such that base station 105-*a* and UEs 115 may utilize directional transmissions for communications. In some cases base station 105-*a* may not be aware of locations for the UEs 115, and in the event that paging information is to be transmitted to a UE 115, the base station 105-*a* may transmit paging group information in a beam sweeping manner (e.g., by sweeping through a set of beams) to notify the UE 115 of a page (e.g., as part of a paging notification). The paging group information may be transmitted in a broadcast channel. In some examples, the paging group information may be transmitted as part of (or multiplexed with) a synchronization signal (e.g., a primary synchronization signal (PSS), a secondary synchronization signal (SSS), a beam reference signal (BRS), an extended synchronization signal (ESS), a physical broadcast channel (PBCH), a demodulation reference signal (DMRS), etc.) during a synchronization subframe. For example, the synchronization subframe may include a number of symbols (e.g., 1, 8, 14, 20 symbols).

Base station 105-*a* may transmit a directional synchronization signal including paging group information in different directions, for example by including a paging group indication in each symbol. In other examples, different channels may be used for paging group information. The discussion of paging group information (e.g., which may in some cases be referred to as a paging group indication, or an indication that conveys or otherwise identifies paging group information to a recipient of the paging group indication) as being multiplexed with a synchronization signal are provided with the understanding that such techniques may be applied to other types of transmissions, such as other broadcast transmissions. It is to be understood that broadcast may be used to refer to intended recipients rather than directionality of a transmission (e.g., such that a broadcast transmission may be directional in some cases). Each directional synchronization signal may be transmitted in a different direction and on a different beam 205 in order to cover a portion of or all of coverage area 110-*a* of base station 105-*a*. For example, base station 105-*a* may transmit paging group information in a synchronization signal over beams 205-*a*, 205-*b*, 205-*c*, and 205-*d*. It should be understood that base station 105-*a* may transmit any number of directional paging group information signals without departing from the scope of the disclosure. In some aspects, the same group paging information may be transmitted over each beam 205 (e.g., the transmissions may be duplicative).

In some cases, the directional synchronization signals including the group paging information may be beam swept across coverage area 110-*a*. In some examples, FDM of synchronization signals and paging group information may be used, which may reduce the total number of beam sweeps necessary to provide both the synchronization and paging group information. Additionally or alternatively, TDM of synchronization signals and paging group information may be used. In some cases, FDM of synchronization signals and paging group information may be implemented dependent upon the frequency used to transmit the beams 205. For example, sub-6 GHz transmit frequencies may support transmission bandwidths on the order of 5 MHz, which may not support concurrent transmission of synchronization signals and paging group information. However, higher transmit frequencies may support larger transmission bandwidths and allow for more reliable concurrent transmissions of synchronization signals and paging group information using FDM. Thus, in some cases, base station 105-a may transmit beams 205 using sub-6 GHz frequencies (e.g., and FDM may be disabled). In other cases, base station 105-a may transmit beams 205 using, for example, 6 GHz to 60 GHz frequencies (e.g., and FDM may be enabled). In some cases, a peak-to-average power ratio (PAPR) of transmissions (e.g., a PSS transmission) may be improved when FDM is disabled, which may be beneficial in cases where path loss may be relatively high (e.g., for higher frequencies). Accordingly, FDM of synchronization signals and paging group information may be based at least in part on channel conditions or path loss conditions (e.g., in addition to or instead of an available bandwidth).

In the present example, UE 115-a and UE 115-b may be examples of UEs 115 associated with a first paging group while UE 115-c may be associated with a second paging group. In some cases, a given UE 115 may only be associated with a single paging group. Alternatively, cases are considered in which a UE 115 may belong to multiple paging group. As described herein, various techniques for assigning UEs 115 to paging groups are considered. For example, a group may be determined based on a device type (e.g., MTC devices may comprise a first group while enhanced mobile broadband (eMBB) devices may comprise a second group). Additionally or alternatively, UEs 115 may be assigned (e.g., randomly) to paging groups upon initial cell access (e.g., via RRC signaling) such that paging groups may not necessarily be associated with a given area of coverage area 110-a. In some cases, a paging group may be determined based on paging responses received at a first point in time. Because the UEs 115 within a given paging group may move (e.g., during an idle mode), base station 105-a may not know a location of the UE 115 at a second point in time (e.g., and may therefore beamsweep paging group information for the paging group as described further below).

Base station 105-a may identify paging information for one or more UEs 115 in the first paging group (e.g., may identify paging information for UE 115-a). Accordingly, base station 105-a may transmit (e.g., beamsweep) paging group information (e.g., a paging group identifier) associated with the first paging group across transmit beams 205. In some cases, base station 105-a may identify a control channel monitoring configuration associated with the first paging group (e.g., where the control channel monitoring configuration includes a set of occasions in which UEs 115 of the first paging group are configured to monitor for control channel transmissions). For example, base station 105-a (e.g., or some other suitable network entity) may configure the UEs 115 of a given paging group (e.g., using RRC signaling, downlink control signaling, etc.) to monitor a set of occasions for reception of a control channel containing paging group information. In some cases, the occasions may be distributed across multiple slots (e.g., or mini-slots) of a discontinuous reception (DRX) cycle. In some cases, a given set of occasions may be unique to a given paging group. Alternatively, at least one occasion of a given set of occasions may be shared between multiple paging groups.

The first UE 115-a may receive the group paging information (e.g., over beam 205-a), and may in some cases transmit a first paging response 210 in an uplink transmission responsive to the group paging information (e.g., because the first UE 115-a identifies that the paging group information is for its own paging group). In some cases, first UE 115-a may receive the paging group information over multiple beams 205 from base station 105-a, and may select one of the received signals to determine uplink resources and an uplink beam for transmission. For example, the selection may be based on a received signal strength (e.g., reference signal received power (RSRP), received signal strength indication (RSSI), channel quality indicator (CQI), signal to noise ratio (SNR), etc.) of the received directional signal.

Similarly, the second UE 115-b may receive the paging group information (e.g., over beam 205-d), and UE 115-b may transmit a second paging response 215 in an uplink transmission responsive to the paging group information. The third UE 115-c may receive the paging group information (e.g., over beam 205-b). However, because the paging group information is not associated with the paging group of the third UE 115-c, it may determine that there is no paging information for it and resume an idle mode of operation. It is to be understood that, in the case where each paging group is associated with a unique set of occasions for receiving the control channel transmission, the third UE 115-c may not receive the paging group information for the first paging group.

Base station 105-a may listen for paging response signals using beam sweep techniques to identify paging responses from different directions. For example, base station 105-a may receive the first paging response 210 from the first UE 115-a and identify that at least one UE 115 of the first paging group may be served over beam 205-a. Likewise, base station 105-a may receive the second paging response 215 from the second UE 115-b and identify that at least one other UE 115 may be served over beam 205-d. The base station 105-a may transmit a directional data channel transmission containing paging information (e.g., for UE 115-a) over the beams 205-a, 205-d. Alternatively, base station 105-a may in some cases transmit the directional data channel transmission containing the paging information over only beam 205-a (e.g., in the case that base station 105-a is able to determine that the paging response received over resources corresponding to beam 205-a originated at UE 115-a).

In some cases, a size of a group identifier (ID) that is used to identify a paging group (e.g., in the case that multiple paging groups share a given set of occasions in a DRX cycle) may be selected based at least in part on a number of UEs 115 expected to be within coverage area 110-a. For example, if 4000 UEs 115 are expected to be paged and each group ID is 6-bits, each group would have about 63 UEs 115, assuming a relatively even distribution if UEs 115 across group IDs. In the event that more UEs 115 may be supported, a larger group ID may be used to provide a manageable number of UEs 115 per group ID. In some cases, base station 105-b may serve many thousands of UEs 115, and a group ID size may be used that has 10-14 bits of group ID, which may provide a relatively low number of UEs 115 per group and allow a reasonable amount of overhead to downlink paging indications that include the group ID.

The paging information included in the data channel transmission may notify a UE 115 about various events such as, for example, data to be transmitted to the UE 115 when in an idle state, system information change is, or an alert event (e.g., commercial mobile alert system (CMAS) messages, earthquake and tsunami warning system (ETWS) messages, public warning system (PWS) messages, etc.). In some cases, paging group information may not be included in a control channel transmission when the subsequent paging information is to be transmitted relatively soon after the control channel transmission and such monitoring by the UEs 115 is likely to use relatively little additional power.

The control channel transmissions with paging group information may thus be used in such examples to further enhance system efficiency and UE operation. In legacy LTE systems, for example, paging messages may follow immediately after a paging indicator (e.g., such that no UE response is needed to get a full paging message). However, when using beam sweep techniques for a paging notification, resources to provide a full paging message would require additional resources for each directional beam transmitted, many of which may not be received at a UE that is the subject of such a paging message. Thus, providing an initial notification followed by a data transmission directed to UE groups of interest may provide more efficient use of resources for systems that use directional transmissions. Furthermore, providing UE group information in a control channel transmission may also allow a UE 115 to ignore an overlapping beam 205 of a UE from a different UE group. In some cases, the base station 105-b may address multiple groups of UEs using a union of two or more beams 205. Additionally or alternatively, the control channel may indicate multiple groups in the content.

Figure 3:
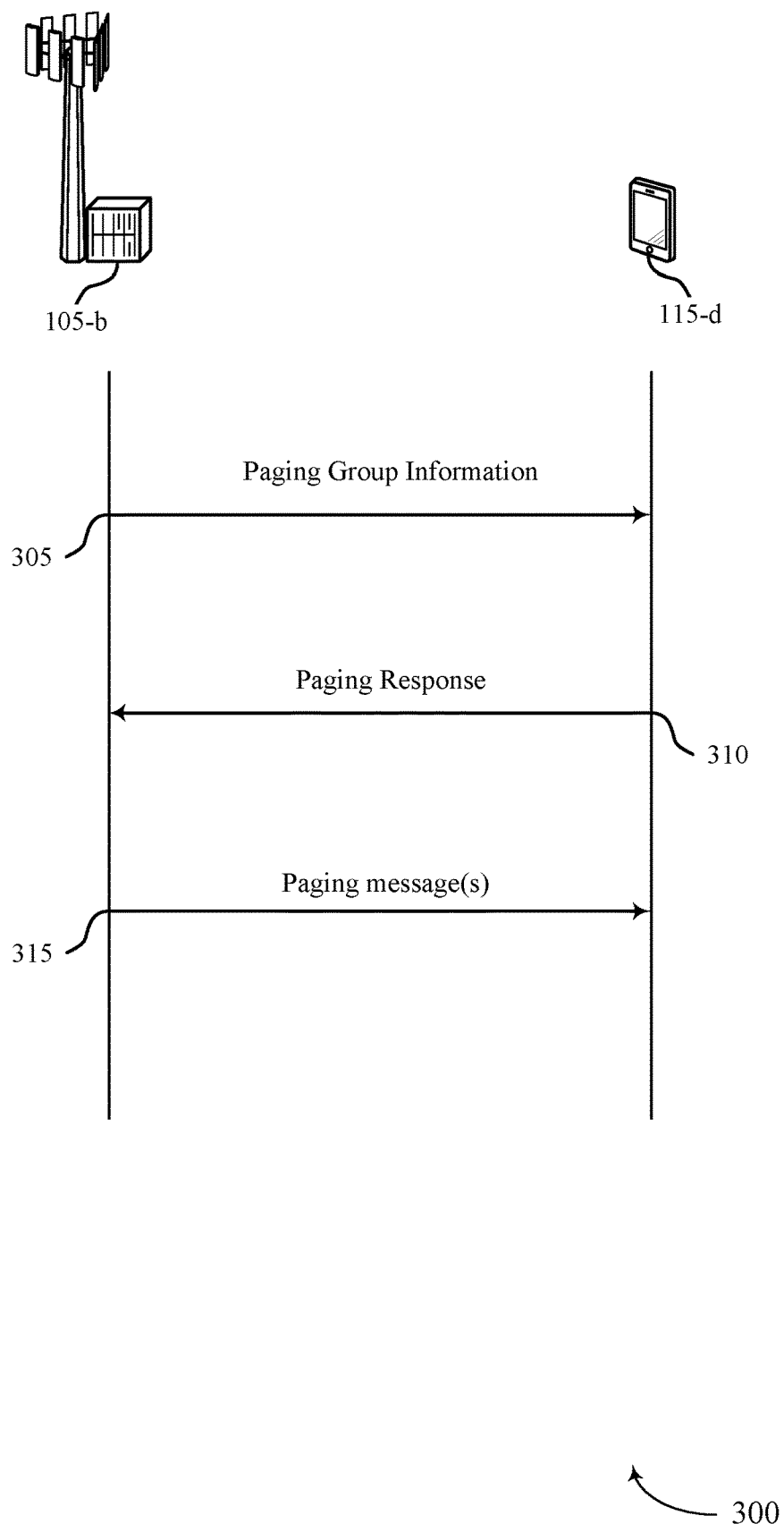
FIG. 3 illustrates an example of a process flow that supports conveying paging group information through control channel transmissions in accordance with aspects of the present disclosure.

FIG. 3 illustrates an example of a process flow 300 that supports conveying paging group information through control channel transmissions in accordance with various aspects of the present disclosure. In some examples, process flow 300 may implement aspects of wireless communications system 100. Process flow 300 includes UE 115-d and base station 105-b, each of which may be an example of the corresponding device described above (e.g., with reference to FIG. 1).

At 305, base station 105-b may transmit (e.g., beamsweep) paging group information (e.g., which may in some cases be frequency division multiplexed with another broadcast transmission such as a synchronization signal). For example, base station 105-b may identify a paging group that includes a group of UEs 115 (e.g., including UE 115-d), where one or more UEs 115 of the group of UEs 115 are to receive paging information. In some cases, base station 105-b (e.g., and UE 115-d) may identify, for the paging group, a control channel monitoring configuration comprising a set of occasions for transmission (e.g., or reception) of the paging group information (e.g., which may be included in a control channel transmission). The control channel monitoring configuration may be unique to the paging group (e.g., such that each paging group may monitor a given set of control channel resources) or may be common to one or more paging groups.

At 310, UE 115-d may transmit a paging response to base station 105-b. For example, the paging response may be transmitted over uplink resources identified based at least in part on the control channel transmission received at 305. In some cases, the paging response may indicate a beam of the set of beams over which the paging group information was beamswept, where UE 115-d receives the control channel transmission over the indicated beam. As described above, UE 115-d may in some cases receive multiple versions of the control channel transmission (e.g., where each version is associated with a given transmit beam). Accordingly, UE 115-d may identify a best beam of the multiple beams (e.g., based on some received signal metric as described above).

At 315, base station 105-b may transmit one or more paging messages to the directions from which it received paging responses. For example, base station 105-b may transmit paging information (e.g., which may include one or more paging messages) over a transmit beam corresponding to the transmit beam indicated by UE 115-d (e.g., in the case that a paging message is intended for UE 115-d). UE 115-d (e.g., and other UEs 115 in the paging group indicated at 305) may monitor transmission resources for a data channel transmission including the paging information. Each UE 115 in the paging group may determine whether the paging information is directed to it and may communicate with base station 105-b or resume idle mode operation accordingly.

Process flow 300 describes one possible implementation. It is to be understood that the operations and the steps may be rearranged or otherwise modified such that other implementations are possible. For example, in some cases, the paging messages may precede the paging responses. As an example, the paging messages may be transmitted in a direction or a set of directions associated with a given UE 115 or group of UEs 115 based on some prior communications.

Figure 4:
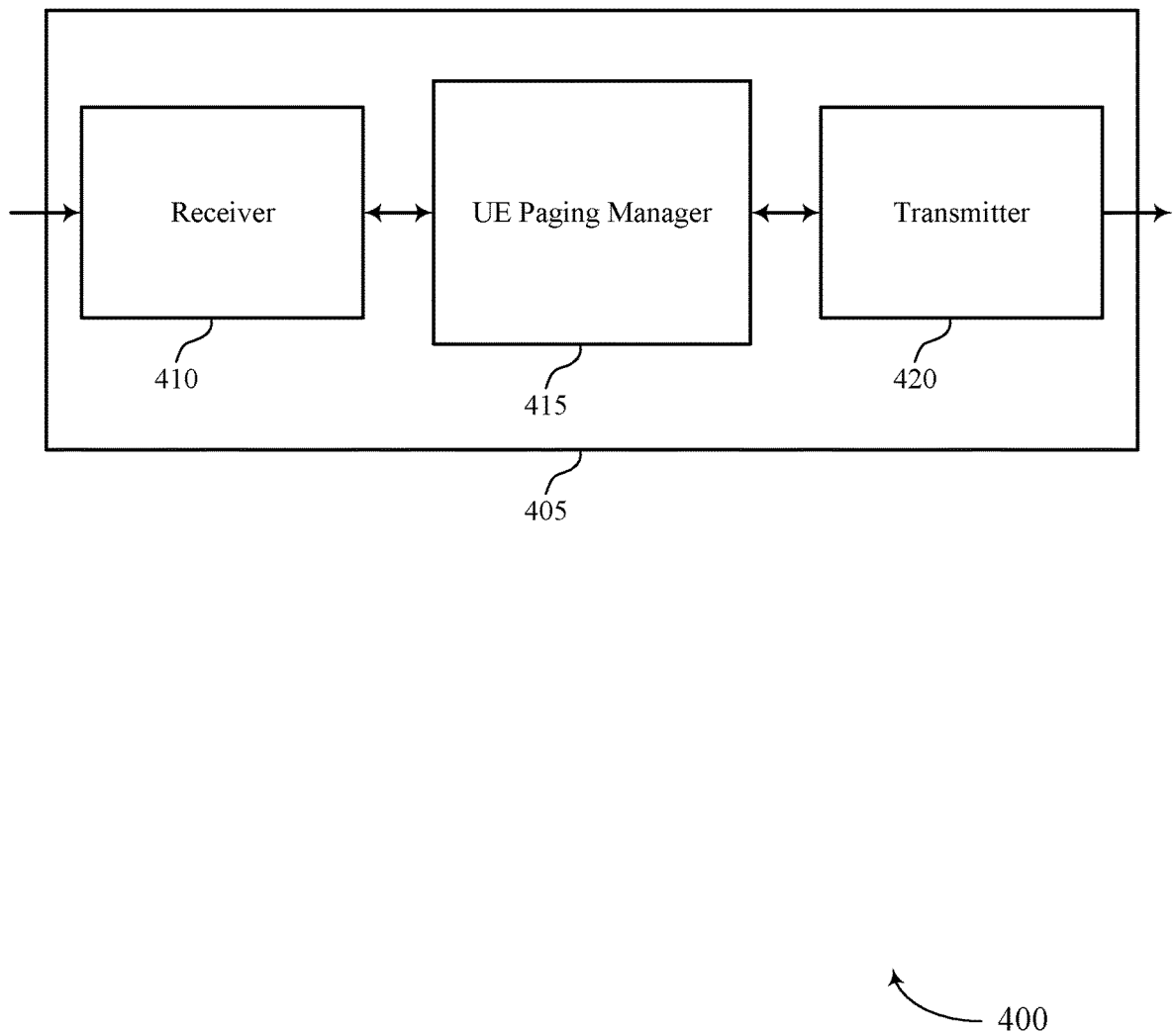
FIGS. 4 through 6 show block diagrams of a device that supports conveying paging group information through control channel transmissions in accordance with aspects of the present disclosure.

FIG. 4 shows a block diagram 400 of a wireless device 405 that supports conveying paging group information through control channel transmissions in accordance with aspects of the present disclosure. Wireless device 405 may be an example of aspects of a UE 115 as described herein. Wireless device 405 may include receiver 410, UE paging manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to conveying paging group information through control channel transmissions, etc.). Information may be passed on to other components of the device. The receiver 410 may be an example of aspects of the transceiver 735 described with reference to FIG. 7. The receiver 410 may utilize a single antenna or a set of antennas.

UE paging manager 415 may be an example of aspects of the UE paging manager 715 described with reference to FIG. 7. UE paging manager 415 and/or at least some of its various sub-components may be implemented in hardware, software executed by a processor, firmware, or any combination thereof. If implemented in software executed by a processor, the functions of the UE paging manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE paging manager 415 and/or at least some of its various sub-components may be physically located at various positions, including being distributed such that portions of functions are implemented at different physical locations by one or more physical devices. In some examples, UE paging manager 415 and/or at least some of its various sub-components may be a separate and distinct component in accordance with various aspects of the present disclosure. In other examples, UE paging manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE paging manager 415 may identify, for a paging group that includes the UE, a control channel monitoring configuration including a set of occasions for reception of a control channel transmission that is transmitted by a base station over a first set of beams. UE paging manager 415 may monitor one or more occasions of the set of occasions for the control channel transmission. UE paging manager 415 may receive the control channel transmission from the base station, the control channel transmission including paging group information for the paging group. UE paging manager 415 may determine, based on the paging group information, transmission resources to monitor for a data channel transmission that includes paging information for at least one UE in the paging group.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
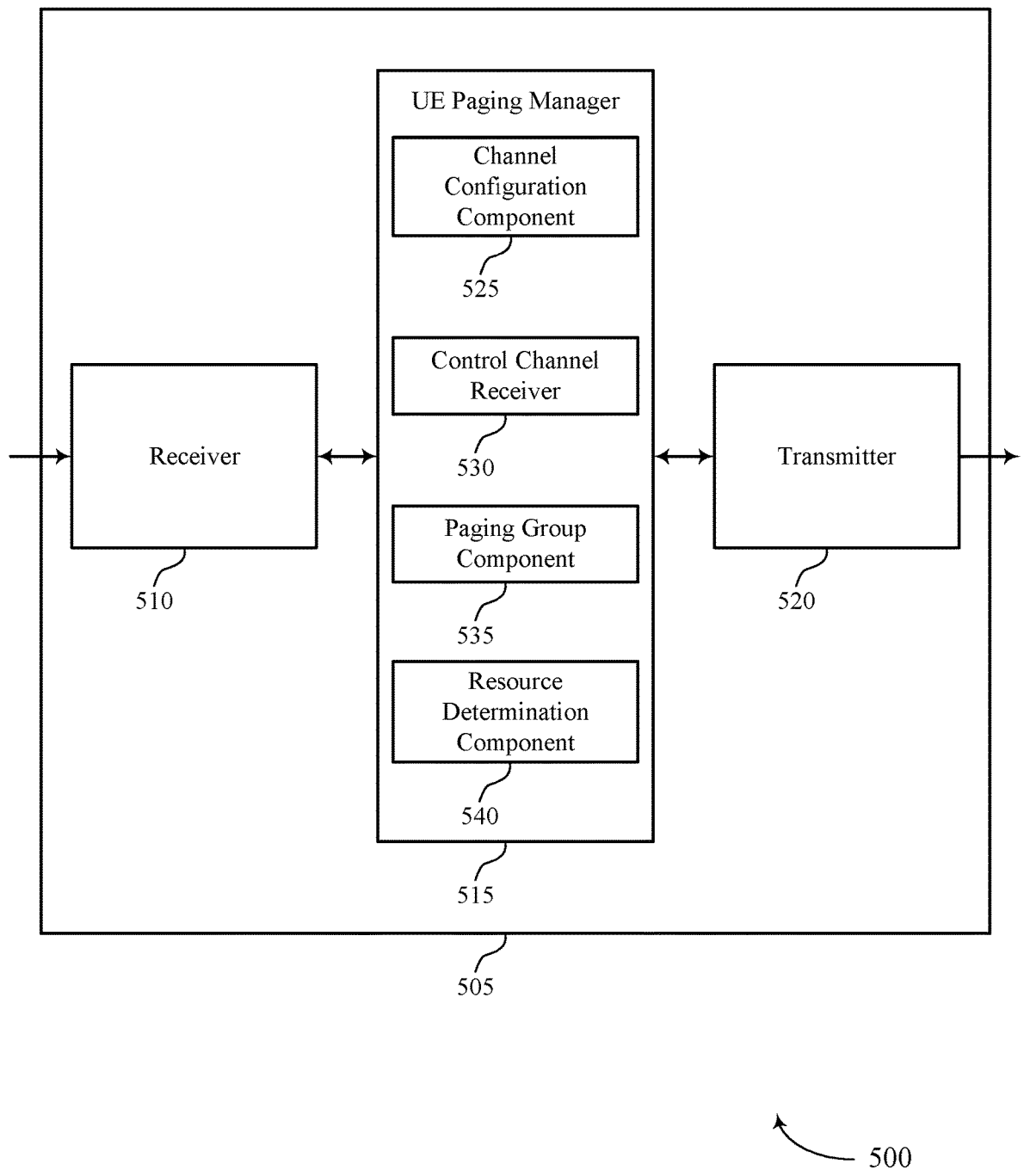

FIG. 5 shows a block diagram 500 of a wireless device 505 that supports conveying paging group information through control channel transmissions in accordance with aspects of the present disclosure. Wireless device 505 may be an example of aspects of a wireless device 405 or a UE 115 as described with reference to FIG. 4. Wireless device 505 may include receiver 510, UE paging manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to conveying paging group information through control channel transmissions, etc.). Information may be passed on to other components of the device. The receiver 510 may be an example of aspects of the transceiver 735 described with reference to FIG. 7. The receiver 510 may utilize a single antenna or a set of antennas.

UE paging manager 515 may be an example of aspects of the UE paging manager 715 described with reference to FIG. 7. UE paging manager 515 may also include channel configuration component 525, control channel receiver 530, paging group component 535, and resource determination component 540.

Channel configuration component 525 may identify, for a paging group that includes the UE, a control channel monitoring configuration including a set of occasions for reception of a control channel transmission that is transmitted by a base station over a first set of beams. Control configuration component 525 may receive at least one of the control channel monitoring configuration or the paging group information through a master information block (MIB), a system information block (SIB), remaining minimum system information (RMSI), a physical downlink control channel (PDCCH), RRC signaling, a handover message, or any combination thereof. In some cases, the occasions are distributed across different slots or mini-slots within a paging DRX cycle.

Control channel receiver 530 may monitor one or more occasions of the set of occasions for the control channel transmission. In some cases, the control channel transmission is frequency division multiplexed or time division multiplexed with a synchronization signal transmission. In some cases, the synchronization signal transmission comprises a PSS, a SSS, a PBCH, a DMRS, or any combination thereof.

Paging group component 535 may receive the control channel transmission from the base station, the control channel transmission including paging group information for the paging group. In some cases, paging group component 735 may receive a second control channel transmission from the base station, the second control channel transmission including other paging group information for a second paging group and determine that the UE is not included in the second paging group. In some cases, the paging group information includes a paging group identifier having a bit-length of 10 to 14 bits. In some cases, the paging group information includes a single bit indicating whether to monitor the transmission resources for the data channel transmission (e.g., in the case that the set of occasions for monitoring for the are unique to a given paging group).

Resource determination component 540 may identify uplink resources for transmitting a paging response based on the received control channel transmission and determine, based on the paging group information, transmission resources to monitor for a data channel transmission that includes paging information for at least one UE in the paging group.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
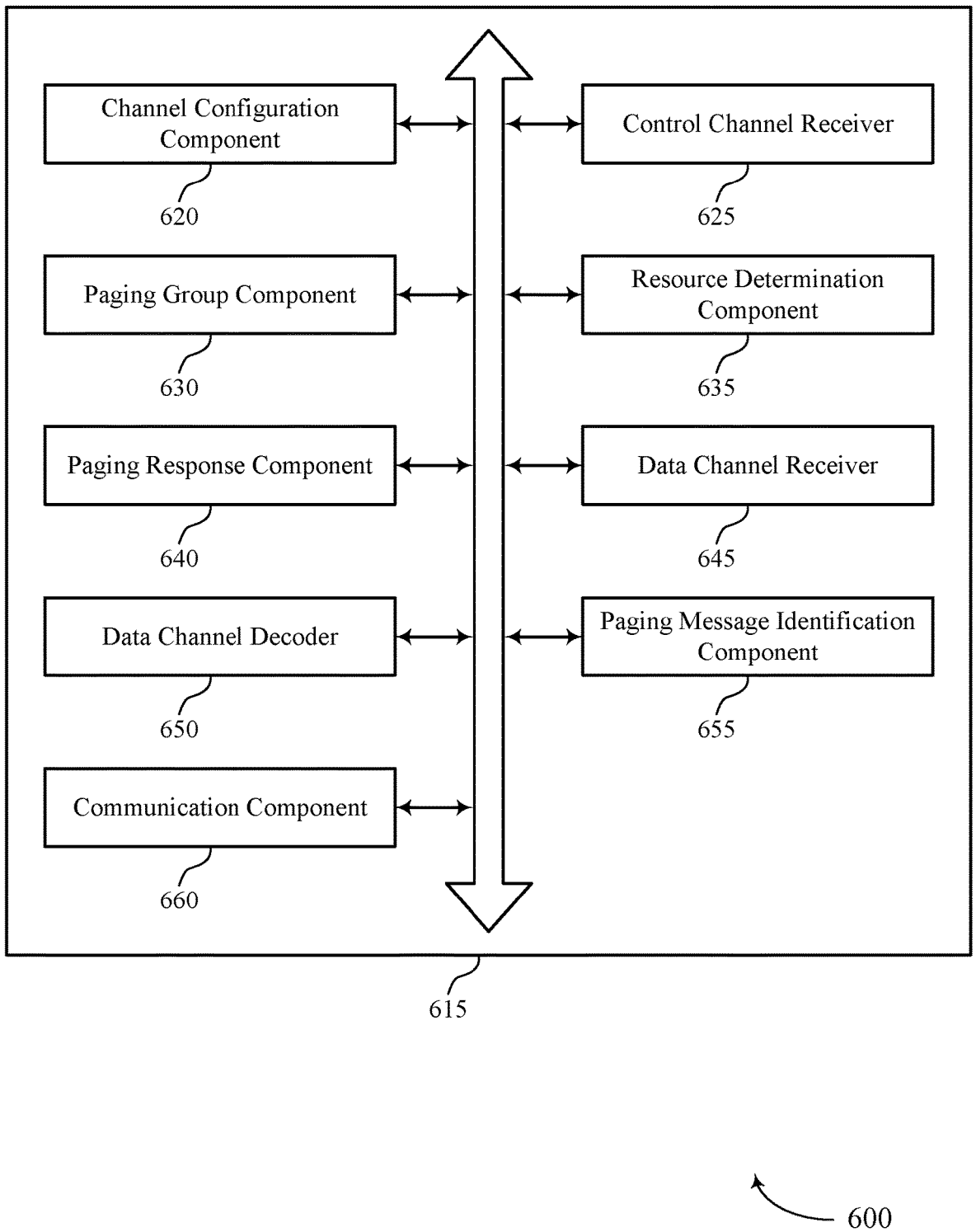

FIG. 6 shows a block diagram 600 of a UE paging manager 615 that supports conveying paging group information through control channel transmissions in accordance with aspects of the present disclosure. The UE paging manager 615 may be an example of aspects of a UE paging manager 415, a UE paging manager 515, or a UE paging manager 715 described with reference to FIGS. 4, 5, and 7. The UE paging manager 615 may include channel configuration component 620, control channel receiver 625, paging group component 630, resource determination component 635, paging response component 640, data channel receiver 645, data channel decoder 650, paging message identification component 655, and communication component 660. Each of these modules may communicate, directly or indirectly, with one another (e.g., via one or more buses).

Channel configuration component 620 may identify, for a paging group that includes the UE, a control channel monitoring configuration including a set of occasions for reception of a control channel transmission that is transmitted by a base station over a first set of beams. Channel configuration component 620 may receive at least one of the control channel monitoring configuration or the paging group information through a MIB, a SIB, RMSI, a PDCCH, RRC signaling, a handover message, or any combination thereof.

In some cases, the occasions are distributed across different slots or mini-slots within a paging DRX cycle.

Control channel receiver 625 may monitor one or more occasions of the set of occasions for the control channel transmission. In some cases, the control channel transmission is frequency division multiplexed or time division multiplexed with a synchronization signal transmission. In some cases, the synchronization signal transmission comprises a PSS, a SSS, a PBCH, a DMRS, or any combination thereof.

Paging group component 630 may receive the control channel transmission from the base station, the control channel transmission including paging group information for the paging group, receive a second control channel transmission from the base station, the second control channel transmission including other paging group information for a second paging group, and determine that the UE is not included in the second paging group. In some cases, the paging group information includes a paging group identifier having a bit-length of 10 to 14 bits. In some cases, the paging group information includes a single bit indicating whether to monitor the transmission resources for the data channel transmission.

Resource determination component 635 may identify uplink resources for transmitting a paging response based on the received control channel transmission and determine, based on the paging group information, transmission resources to monitor for a data channel transmission that includes paging information for at least one UE in the paging group.

Paging response component 640 may transmit the paging response to the base station using the identified uplink resources. In some cases, the paging response indicates a beam of the first set of beams used to transmit, by the base station, the control channel transmission.

Data channel receiver 645 may monitor the transmission resources for the data channel transmission and monitor common transmission resources for data channel transmissions responsive to determining that the UE is not included in the other paging group information, the common transmission resources associated with two or more paging groups. In some cases, the data channel transmission further includes an indication of the paging group.

Data channel decoder 650 may decode one or more transmissions received on the monitored transmission resources, the one or more transmissions including the data channel transmission. Paging message identification component 655 may identify a paging message in the data channel transmission and identify that the paging message includes paging information that is directed to the UE. Communication component 660 may communicate with the base station based on the paging message and operate in an idle mode based on identifying that the paging message does not include paging information directed to the UE.

Figure 7:
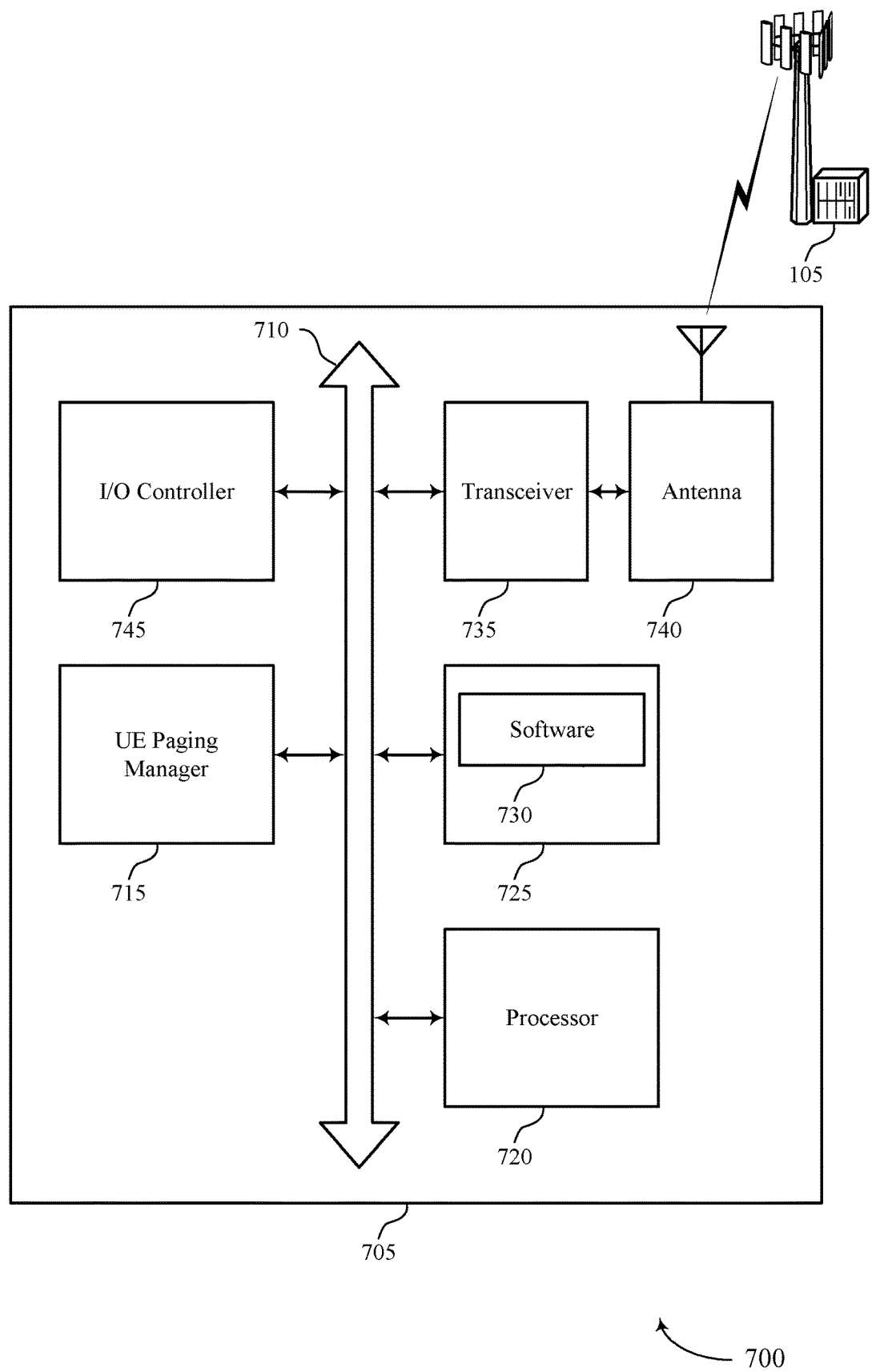
FIG. 7 illustrates a block diagram of a system including a UE that supports conveying paging group information through control channel transmissions in accordance with aspects of the present disclosure.

FIG. 7 shows a diagram of a system 700 including a device 705 that supports conveying paging group information through control channel transmissions in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE paging manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting conveying paging group information through control channel transmissions).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support conveying paging group information through control channel transmissions. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
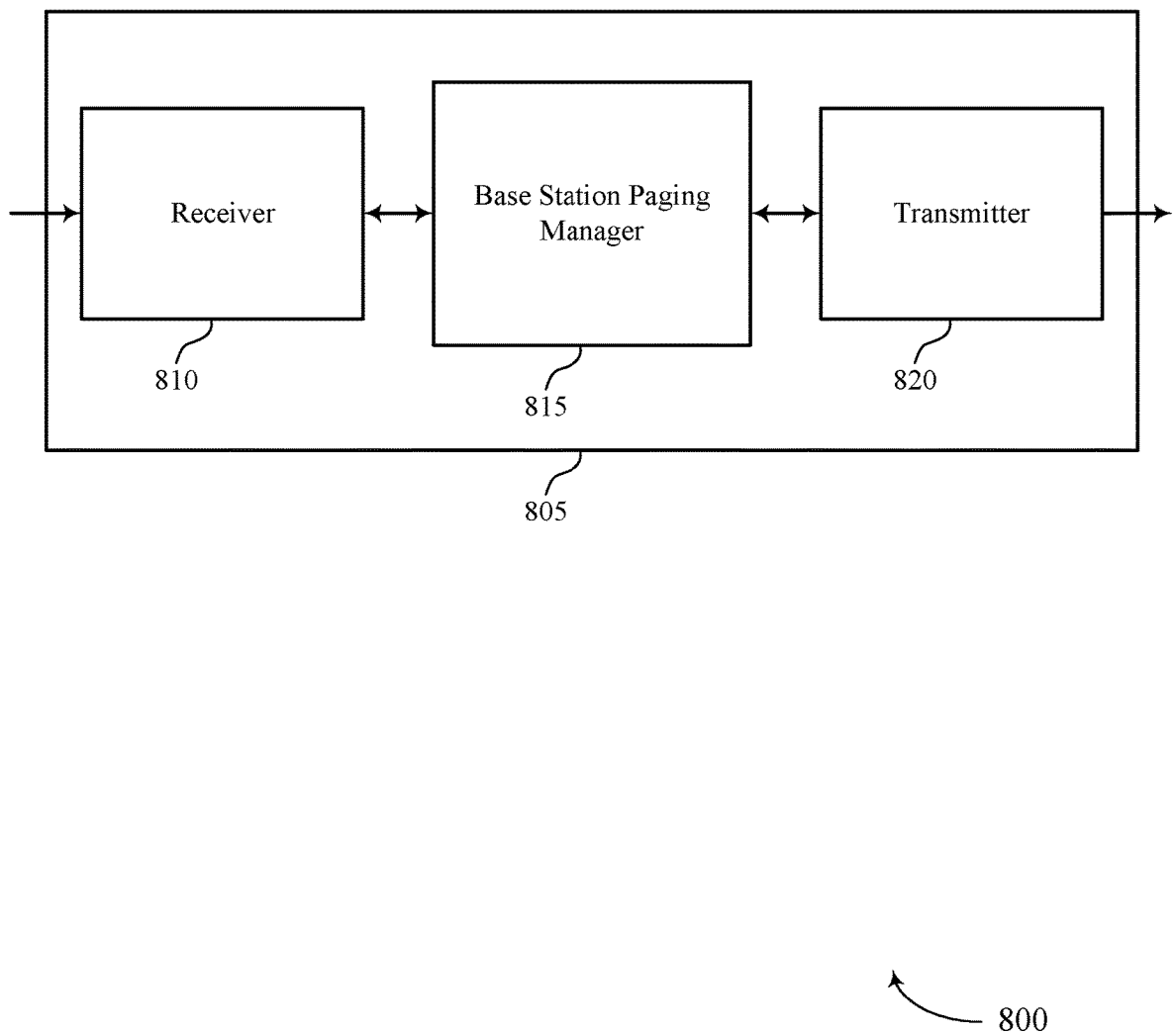
FIGS. 8 through 10 show block diagrams of a device that supports conveying paging group information through control channel transmissions in accordance with aspects of the present disclosure.

FIG. 8 shows a block diagram 800 of a wireless device 805 that supports conveying paging group information through control channel transmissions in accordance with aspects of the present disclosure. Wireless device 805 may be an example of aspects of a base station 105 as described herein. Wireless device 805 may include receiver 810, base station paging manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to conveying paging group information through control channel transmissions, etc.). Information may be passed on to other components of the device. The receiver 810 may be an example of aspects of the transceiver 1135 described with reference to FIG. 11. The receiver 810 may utilize a single antenna or a set of antennas.

Base station paging manager 815 may be an example of aspects of the base station paging manager 1115 described with reference to FIG. 11. Base station paging manager 815 and/or at least some of its various sub-components may be implemented in hardware, software executed by a processor, firmware, or any combination thereof. If implemented in software executed by a processor, the functions of the base station paging manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station paging manager 815 and/or at least some of its various sub-components may be physically located at various positions, including being distributed such that portions of functions are implemented at different physical locations by one or more physical devices. In some examples, base station paging manager 815 and/or at least some of its various sub-components may be a separate and distinct component in accordance with various aspects of the present disclosure. In other examples, base station paging manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station paging manager 815 may identify a paging group that includes a set of UEs, where one or more UEs of the set of UEs are to receive paging information. Base station paging manager 815 may transmit a control channel transmission over a first set of beams, the control channel transmission including paging group information providing an indication of a data channel transmission to include paging information for the one or more UEs. Base station paging manager 815 may transmit, over one or more of the first set of beams, the data channel transmission that includes paging information for the one or more UEs.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
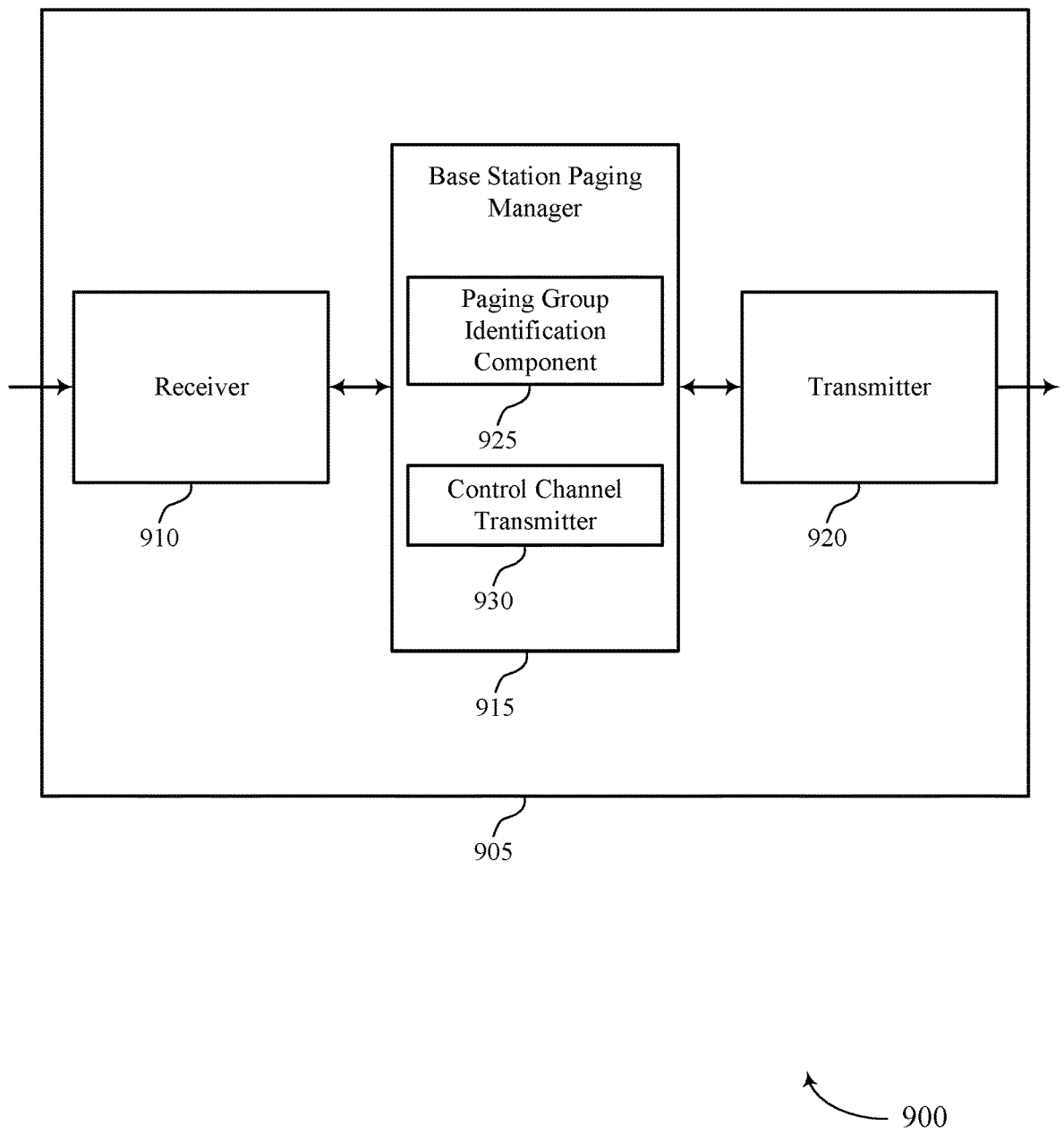

FIG. 9 shows a block diagram 900 of a wireless device 905 that supports conveying paging group information through control channel transmissions in accordance with aspects of the present disclosure. Wireless device 905 may be an example of aspects of a wireless device 805 or a base station 105 as described with reference to FIG. 8. Wireless device 905 may include receiver 910, base station paging manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to conveying paging group information through control channel transmissions, etc.). Information may be passed on to other components of the device. The receiver 910 may be an example of aspects of the transceiver 1135 described with reference to FIG. 11. The receiver 910 may utilize a single antenna or a set of antennas.

Base station paging manager 915 may be an example of aspects of the base station paging manager 1115 described with reference to FIG. 11. Base station paging manager 915 may also include paging group identification component 925 and control channel transmitter 930. Paging group identification component 925 may identify a paging group that includes a set of UEs, where one or more UEs of the set of UEs are to receive paging information.

Control channel transmitter 930 may transmit a control channel transmission over a first set of beams, the control channel transmission including paging group information providing an indication of a data channel transmission to include paging information for the one or more UEs. In some cases, the paging group information includes an indication of transmission resources to be monitored by the one or more UEs for the data channel transmission that includes the paging information.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
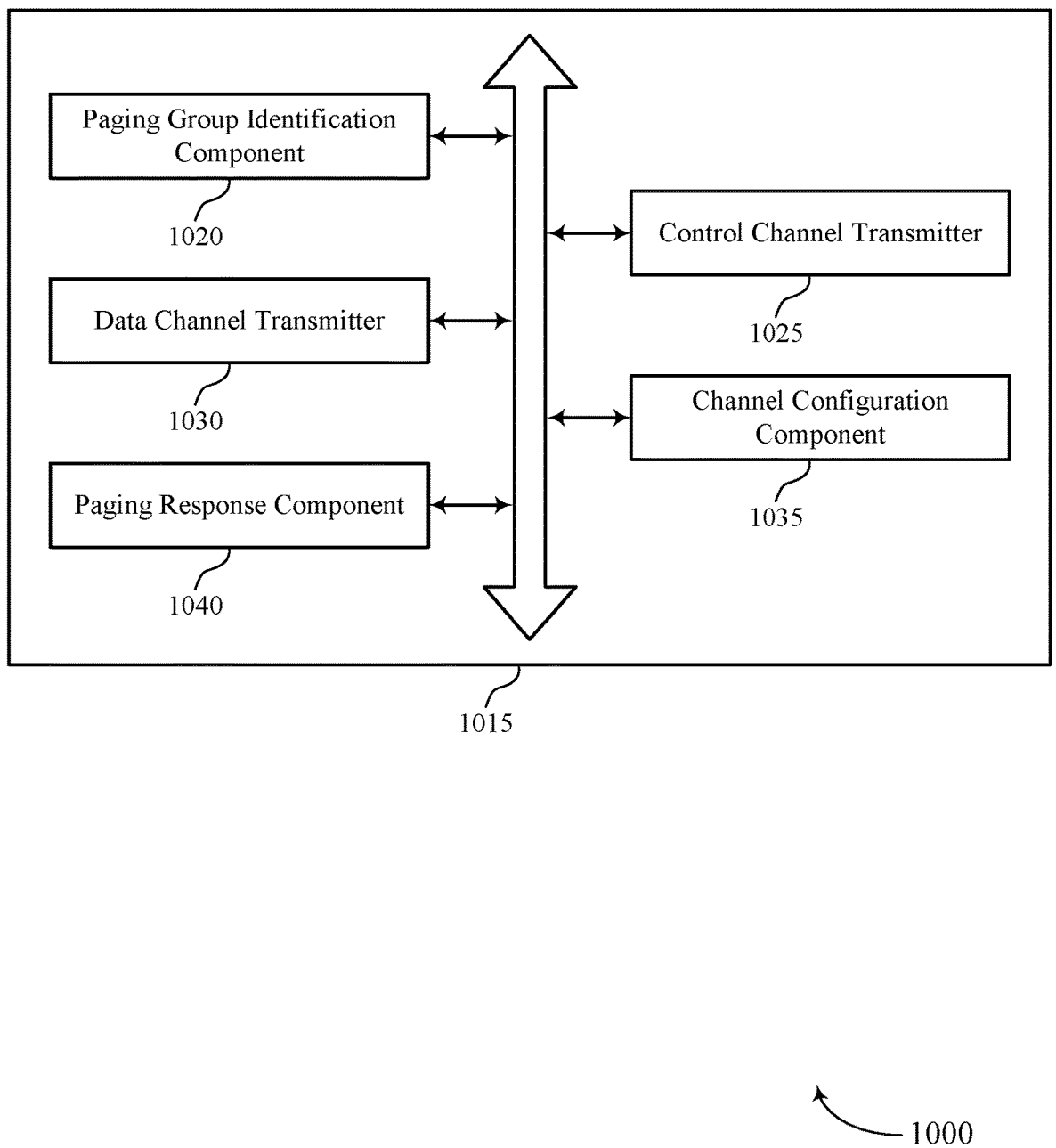

FIG. 10 shows a block diagram 1000 of a base station paging manager 1015 that supports conveying paging group information through control channel transmissions in accordance with aspects of the present disclosure. The base station paging manager 1015 may be an example of aspects of a base station paging manager 1115 described with reference to FIGS. 8, 9, and 11. The base station paging manager 1015 may include paging group identification component 1020, control channel transmitter 1025, data channel transmitter 1030, channel configuration component 1035, and paging response component 1040. Each of these modules may communicate, directly or indirectly, with one another (e.g., via one or more buses).

Paging group identification component 1020 may identify a paging group that includes a set of UEs, where one or more UEs of the set of UEs are to receive paging information. Control channel transmitter 1025 may transmit a control channel transmission over a first set of beams, the control channel transmission including paging group information providing an indication of a data channel transmission to include paging information for the one or more UEs. In some cases, the paging group information includes an indication of transmission resources to be monitored by the one or more UEs for the data channel transmission that includes the paging information. In some cases, the paging group information includes a single bit indicating whether to monitor for the data channel transmission.

Data channel transmitter 1030 may transmit, over one or more of the first set of beams, the data channel transmission that includes paging information for the one or more UEs. Data channel transmitter 1030 may frequency division multiplex (e.g., or time division multiplex) the control channel transmission with a synchronization signal transmission (e.g., PSS, SSS, PBCH, DMRS, etc.). In some cases, the one or more of the first set of beams is selected to transmit paging information to a set of directions associated with the one or more UEs. In some cases, the data channel transmission further includes an indicator of the paging group. In some cases, the one or more of the first set of beams is selected to transmit the data channel transmission to the paging group and to a second paging group having a second set of UEs. In some cases, the paging group information includes information indicating the paging group and the second paging group are to monitor for the data channel transmission. In some cases, the paging group information includes a paging group ID having a bit-length of 10 to 14 bits.

Channel configuration component 1035 may identify, for the paging group, a control channel monitoring configuration including a set of occasions for reception of the control channel transmission, where the control channel transmission is transmitted based on the control channel monitoring configuration.

Paging response component 1040 may receive, from a UE of the set of UEs, a paging response on a first resource of a set of transmission resources allocated for paging responses, where the paging response indicates a beam of the first set of beams associated with the UE. In some cases, the beams used to transmit the data channel transmission may be identified based at least in part on the paging response(s).

Figure 11:
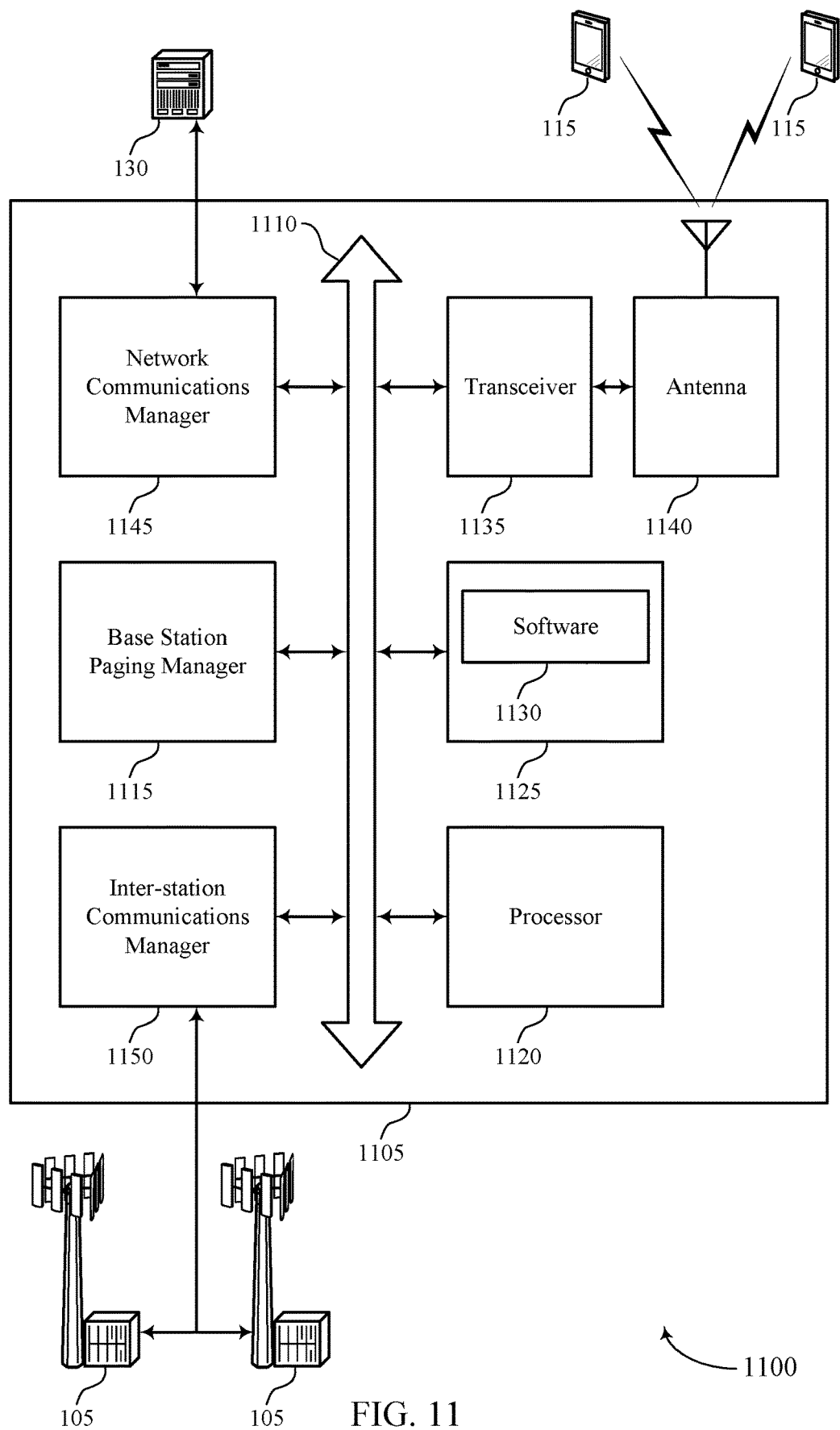
FIG. 11 illustrates a block diagram of a system including a base station that supports conveying paging group information through control channel transmissions in accordance with aspects of the present disclosure.

FIG. 11 shows a diagram of a system 1100 including a device 1105 that supports conveying paging group information through control channel transmissions in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station paging manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting conveying paging group information through control channel transmissions).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support conveying paging group information through control channel transmissions. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions. Network communications manager 1145 may manage communications with the core network 130 (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a LTE/LTE-A wireless communication network technology to provide communication between base stations 105.

Figure 12:
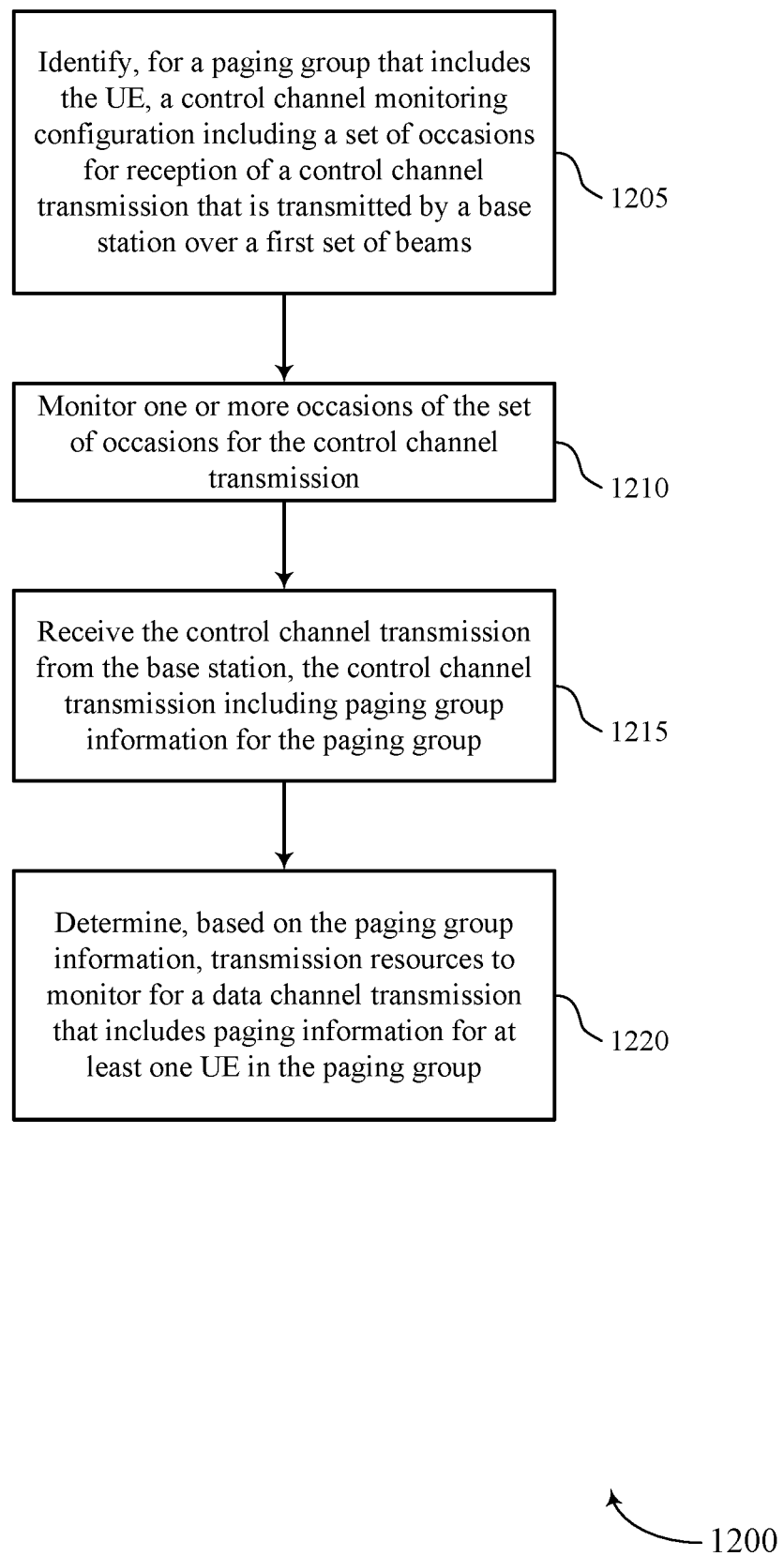
FIGS. 12 through 15 illustrate methods for conveying paging group information through control channel transmissions in accordance with aspects of the present disclosure.

FIG. 12 shows a flowchart illustrating a method 1200 for conveying paging group information through control channel transmissions in accordance with aspects of the present disclosure. The operations of method 1200 may be implemented by a UE 115 or its components as described herein. For example, the operations of method 1200 may be performed by a UE paging manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify, for a paging group that includes the UE, a control channel monitoring configuration comprising a set of occasions for reception of a control channel transmission that is transmitted by a base station over a first set of beams. The operations of block 1205 may be performed according to the methods described herein. In certain examples, aspects of the operations of block 1205 may be performed by a channel configuration component as described with reference to FIGS. 4 through 7.

At block 1210 the UE 115 may monitor one or more occasions of the set of occasions for the control channel transmission. The operations of block 1210 may be performed according to the methods described herein. In certain examples, aspects of the operations of block 1210 may be performed by a control channel receiver as described with reference to FIGS. 4 through 7.

At block 1215 the UE 115 may receive the control channel transmission from the base station, the control channel transmission comprising paging group information for the paging group. The operations of block 1215 may be performed according to the methods described herein. In certain examples, aspects of the operations of block 1215 may be performed by a paging group component as described with reference to FIGS. 4 through 7.

At block 1220 the UE 115 may determine, based at least in part on the paging group information, transmission resources to monitor for a data channel transmission that includes paging information for at least one UE in the paging group. The operations of block 1220 may be performed according to the methods described herein. In certain examples, aspects of the operations of block 1220 may be performed by a resource determination component as described with reference to FIGS. 4 through 7.

Figure 13:
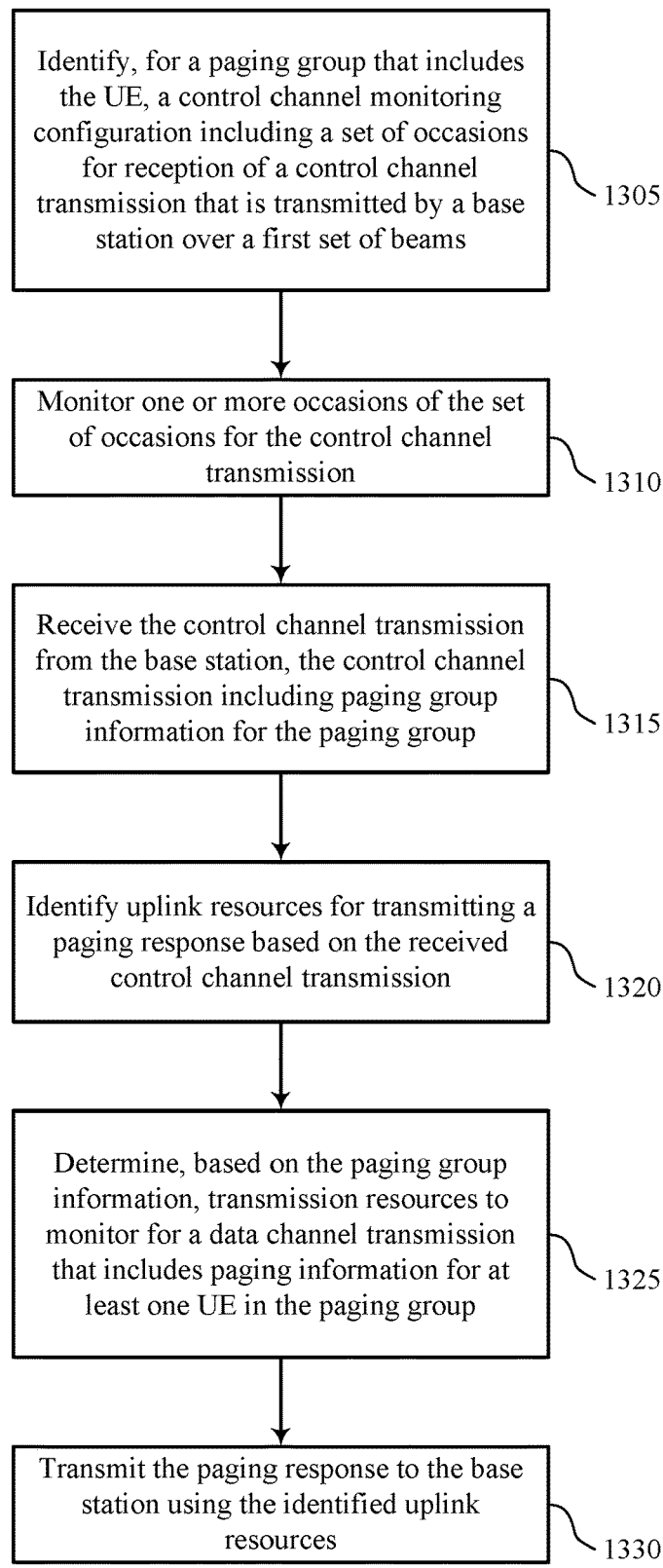

FIG. 13 shows a flowchart illustrating a method 1300 for conveying paging group information through control channel transmissions in accordance with aspects of the present disclosure. The operations of method 1300 may be implemented by a UE 115 or its components as described herein. For example, the operations of method 1300 may be performed by a UE paging manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify, for a paging group that includes the UE, a control channel monitoring configuration comprising a set of occasions for reception of a control channel transmission that is transmitted by a base station over a first set of beams. The operations of block 1305 may be performed according to the methods described herein. In certain examples, aspects of the operations of block 1305 may be performed by a channel configuration component as described with reference to FIGS. 4 through 7.

At block 1310 the UE 115 may monitor one or more occasions of the set of occasions for the control channel transmission. The operations of block 1310 may be performed according to the methods described herein. In certain examples, aspects of the operations of block 1310 may be performed by a control channel receiver as described with reference to FIGS. 4 through 7.

At block 1315 the UE 115 may receive the control channel transmission from the base station, the control channel transmission comprising paging group information for the paging group. The operations of block 1315 may be performed according to the methods described herein. In certain examples, aspects of the operations of block 1315 may be performed by a paging group component as described with reference to FIGS. 4 through 7.

At block 1320 the UE 115 may identify uplink resources for transmitting a paging response based at least in part on the received control channel transmission. The operations of block 1320 may be performed according to the methods described herein. In certain examples, aspects of the operations of block 1320 may be performed by a resource determination component as described with reference to FIGS. 4 through 7.

At block 1325 the UE 115 may determine, based at least in part on the paging group information, transmission resources to monitor for a data channel transmission that includes paging information for at least one UE in the paging group. The operations of block 1325 may be performed according to the methods described herein. In certain examples, aspects of the operations of block 1325 may be performed by a resource determination component as described with reference to FIGS. 4 through 7.

At block 1330 the UE 115 may transmit the paging response to the base station using the identified uplink resources. The operations of block 1330 may be performed according to the methods described herein. In certain examples, aspects of the operations of block 1330 may be performed by a paging response component as described with reference to FIGS. 4 through 7.

Figure 14:
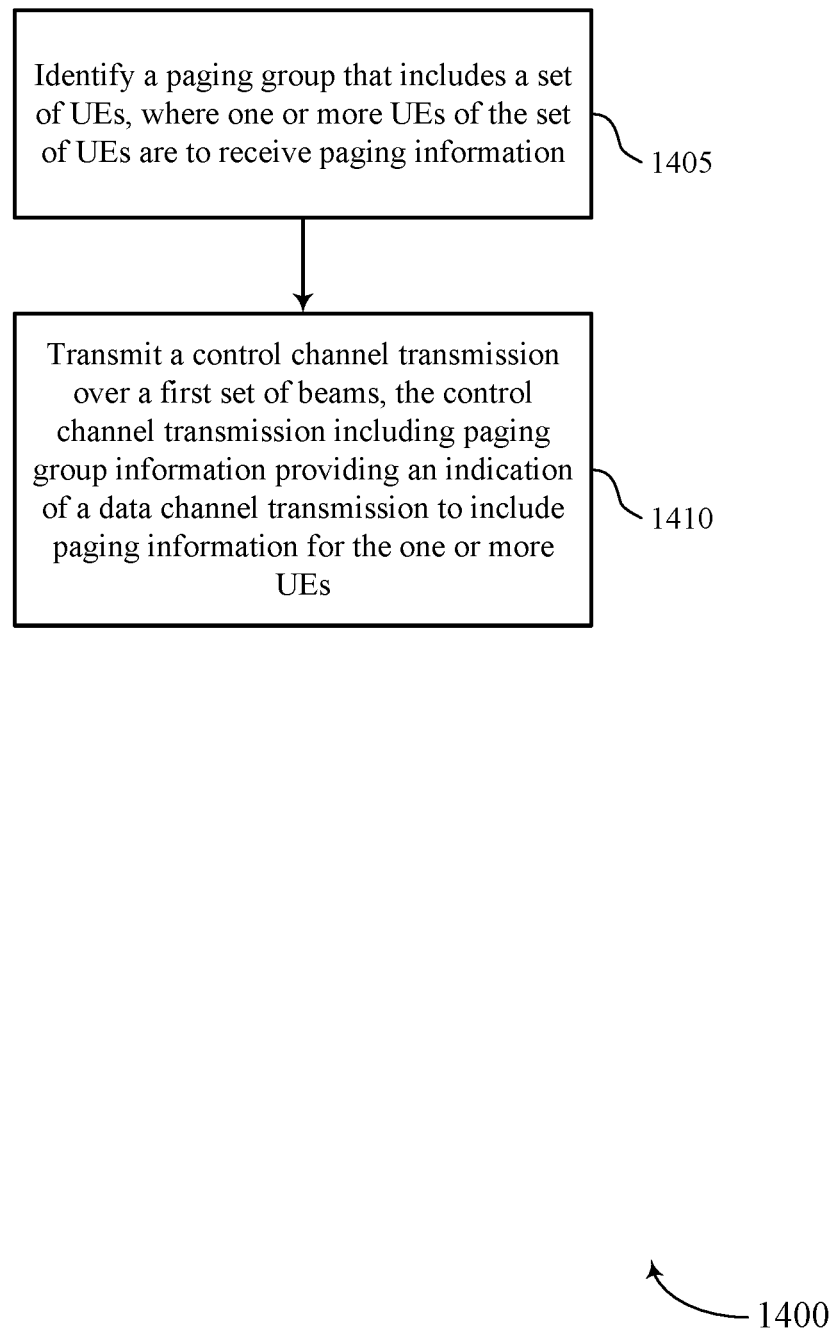

FIG. 14 shows a flowchart illustrating a method 1400 for conveying paging group information through control channel transmissions in accordance with aspects of the present disclosure. The operations of method 1400 may be implemented by a base station 105 or its components as described herein. For example, the operations of method 1400 may be performed by a base station paging manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify a paging group that includes a plurality of UEs, wherein one or more UEs of the plurality of UEs are to receive paging information. The operations of block 1405 may be performed according to the methods described herein. In certain examples, aspects of the operations of block 1405 may be performed by a paging group identification component as described with reference to FIGS. 8 through 11.

At block 1410 the base station 105 may transmit a control channel transmission over a first set of beams, the control channel transmission comprising paging group information providing an indication of a data channel transmission to include paging information for the one or more UEs. The operations of block 1410 may be performed according to the methods described herein. In certain examples, aspects of the operations of block 1410 may be performed by a control channel transmitter as described with reference to FIGS. 8 through 11.

Figure 15:
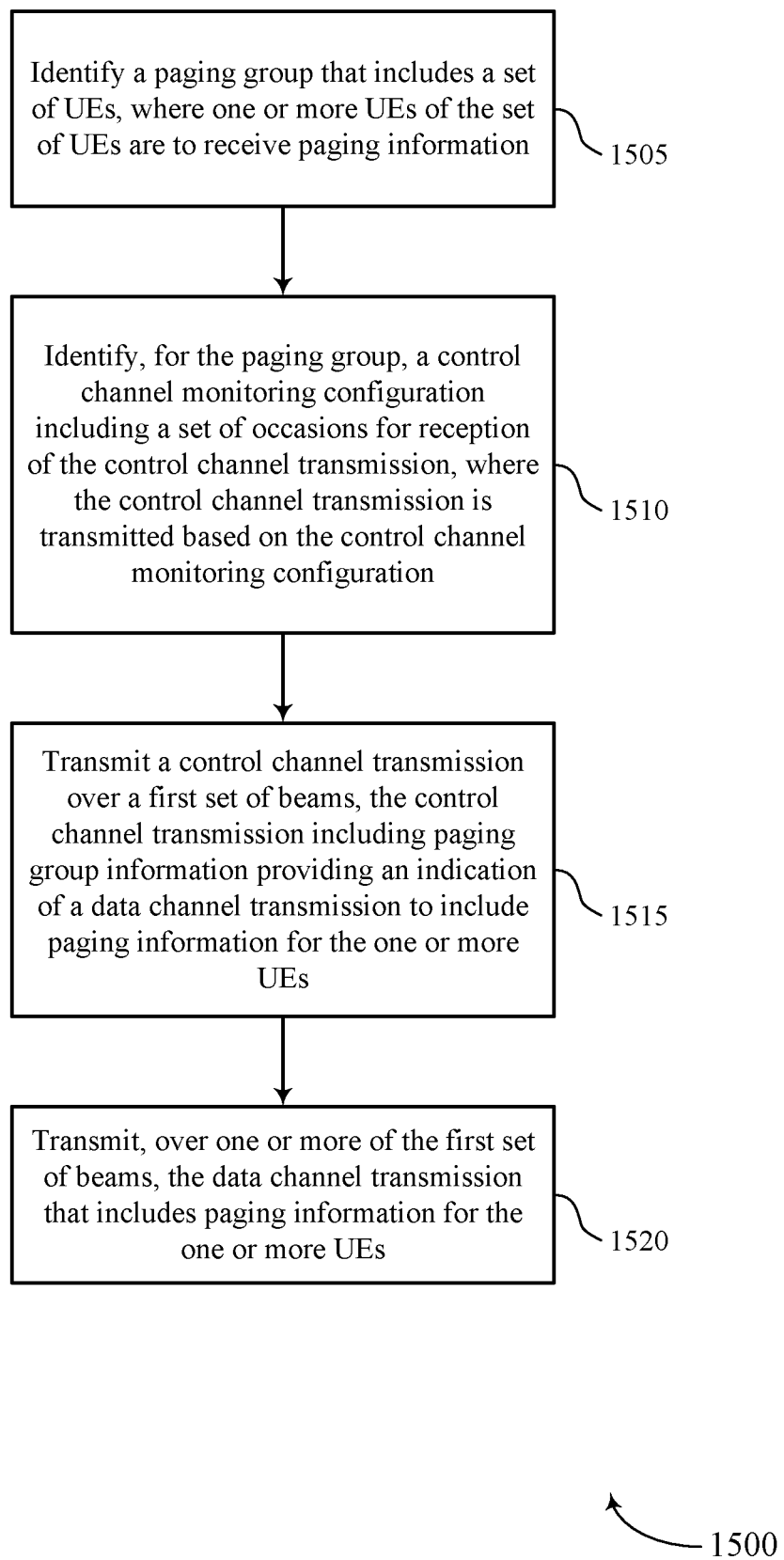

FIG. 15 shows a flowchart illustrating a method 1500 for conveying paging group information through control channel transmissions in accordance with aspects of the present disclosure. The operations of method 1500 may be implemented by a base station 105 or its components as described herein. For example, the operations of method 1500 may be performed by a base station paging manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a paging group that includes a plurality of UEs, wherein one or more UEs of the plurality of UEs are to receive paging information. The operations of block 1505 may be performed according to the methods described herein. In certain examples, aspects of the operations of block 1505 may be performed by a paging group identification component as described with reference to FIGS. 8 through 11.

At block 1510 the base station 105 may identify, for the paging group, a control channel monitoring configuration comprising a set of occasions for reception of the control channel transmission, wherein the control channel transmission is transmitted based at least in part on the control channel monitoring configuration. The operations of block 1510 may be performed according to the methods described herein. In certain examples, aspects of the operations of block 1510 may be performed by a channel configuration component as described with reference to FIGS. 8 through 11.

At block 1515 the base station 105 may transmit a control channel transmission over a first set of beams, the control channel transmission comprising paging group information providing an indication of a data channel transmission to include paging information for the one or more UEs. The operations of block 1515 may be performed according to the methods described herein. In certain examples, aspects of the operations of block 1515 may be performed by a control channel transmitter as described with reference to FIGS. 8 through 11.

At block 1520 the base station 105 may transmit, over one or more of the first set of beams, the data channel transmission that includes paging information for the one or more UEs. The operations of block 1520 may be performed according to the methods described herein. In certain examples, aspects of the operations of block 1520 may be performed by a data channel transmitter as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

identifying, for a paging group that includes the UE, a control channel monitoring configuration comprising a set of occasions for reception of a control channel transmission that is frequency division multiplexed or time division multiplexed with a synchronization signal transmission comprising a primary synchronization signal (PSS), a secondary synchronization signal (SSS), a demodulation reference signal (DMRS), and a physical broadcast channel (PBCH), wherein the control channel transmission is transmitted by a base station over a first set of directional beams corresponding to the set of occasions;

monitoring a plurality of occasions of the set of occasions for the control channel transmission, the plurality of occasions corresponding to a plurality of directional beams of the first set of directional beams;

receiving, in at least one of the plurality of occasions, the synchronization signal transmission and the control channel transmission from the base station, the control channel transmission comprising paging group information for the paging group;

selecting, by the UE, at least one directional beam of a second set of directional beams for transmitting a paging response based at least in part on the at least one of the plurality of occasions used to receive the control channel transmission and on a received signal strength of the control channel transmission;

transmitting, to the base station, the paging response on the selected at least one directional beam; and determining, based at least in part on the paging group information and the selected at least one directional beam of the second set of directional beams, transmission resources to monitor for a data channel transmission that includes paging information for at least one UE in the paging group.

2. The method of claim 1, further comprising:

receiving at least one of the control channel monitoring configuration or the paging group information through a master information block (MIB), a system information block (SIB), a remaining minimum system information (RMSI), a physical downlink control channel (PDCCH), radio resource control (RRC) signaling, a handover message, or any combination thereof.

3. The method of claim 1, wherein the paging response indicates a directional beam of the first set of directional beams used to transmit, by the base station, the control channel transmission.

4. The method of claim 1, further comprising:

monitoring the transmission resources for the data channel transmission;

decoding one or more transmissions received on the monitored transmission resources, the one or more transmissions including the data channel transmission; and identifying a paging message in the data channel transmission.

5. The method of claim 4, further comprising:
identifying that the paging message includes the paging information that is directed to the UE; and
communicating with the base station based at least in part on the paging message.

6. The method of claim 4, further comprising:
operating in an idle mode based at least in part on identifying that the paging message does not include the paging information directed to the UE.

7. The method of claim 1, wherein a first occasion of the set of occasions is contained in a first slot or a first mini-slot of a paging discontinuous reception (DRX) cycle, and wherein a second occasion of the set of occasions is contained in a second slot or a second mini-slot of the paging DRX cycle.

8. The method of claim 1, wherein the data channel transmission further includes an indication of the paging group.

9. The method of claim 1, wherein the paging group information comprises a paging group identifier having a bit-length of 10 to 14 bits.

10. The method of claim 1, wherein the control channel transmission is frequency division multiplexed with the synchronization signal transmission.

11. The method of claim 1, wherein the paging group information comprises a single bit indicating whether to monitor the transmission resources for the data channel transmission.

12. The method of claim 10, wherein frequency division multiplexing of the control channel transmission is based at least in part on a frequency used to transmit the first set of directional beams.

13. The method of claim 10, wherein the control channel transmission is frequency division multiplexed with the synchronization signal transmission in a same subframe.

14. The method of claim 10, wherein the frequency division multiplexing of the control channel transmission is based at least in part on channel conditions, path loss conditions, or a combination thereof.

15. A method for wireless communication at a base station, comprising:
identifying a paging group that includes a plurality of user equipments (UEs), wherein one or more UEs of the plurality of UEs are to receive paging information;
identifying, for the paging group, a control channel monitoring configuration comprising a set of occasions for reception of a control channel transmission;
frequency division multiplexing or time division multiplexing the control channel transmission with a synchronization signal transmission comprising a primary synchronization signal (PSS), a secondary synchronization signal (SSS), a physical broadcast channel (PBCH), and a demodulation reference signal (DMRS) corresponding to the PBCH;
transmitting, based at least in part on the control channel monitoring configuration, the synchronization signal transmission and the control channel transmission over a first set of directional beams, the control channel transmission comprising paging group information providing an indication of a data channel transmission to include the paging information for the one or more UEs;
receiving, from a UE of the plurality of UEs, a paging response over at least one directional beam of a second set of directional beams; and
selecting downlink resources to transmit the data channel, based at least in part on the at least one directional beam of the second set of directional beams used to receive the paging response and a received signal strength of the control channel transmission.

16. The method of claim 15, further comprising:
transmitting, over one or more of the directional first set of beams, the data channel transmission that includes the paging information for the one or more UEs.

17. The method of claim 15, wherein a first occasion of the set of occasions is contained in a first slot or a first mini-slot of a paging discontinuous reception (DRX) cycle, and wherein a second occasion of the set of occasions is contained in a second slot or a second mini-slot of the paging DRX cycle.

18. The method of claim 15, wherein one or more of the first set of directional beams is selected to transmit the paging information to a set of directions associated with the one or more UEs.

19. The method of claim 15,
wherein the uplink resources are allocated for paging responses; and
wherein the paging response indicates a directional beam of the first set of directional beams associated with the UE.

20. The method of claim 19, further comprising:
selecting one or more of the first set of directional beams to transmit the data channel transmission based at least in part on the indicated directional beam.

21. The method of claim 15, wherein the paging group information comprises an indication of transmission resources to be monitored by the one or more UEs for the data channel transmission that includes the paging information.

22. The method of claim 15, wherein the data channel transmission further includes an indicator of the paging group.

23. The method of claim 15, wherein one or more of the first set of directional beams is selected to transmit the data channel transmission to the paging group and to a second paging group having a second plurality of UEs.

24. The method of claim 23, wherein the paging group information includes information indicating the paging group and the second paging group are to monitor for the data channel transmission.

25. The method of claim 15, wherein the paging group information comprises a paging group identifier having a bit-length of 10 to 14 bits.

26. The method of claim 15, wherein the paging group information comprises a single bit indicating whether to monitor for the data channel transmission.

27. The method of claim 15, further comprising:
frequency division multiplexing the control channel transmission with the synchronization signal transmission.

28. An apparatus for wireless communication, comprising:
a processor;
memory in electronic communication with the processor; and
instructions stored in the memory and operable, when executed by the processor, to cause the apparatus to:

identify, for a paging group that includes the apparatus, a control channel monitoring configuration comprising a set of occasions for reception of a control channel transmission that is frequency division multiplexed or time division multiplexed with a synchronization signal transmission comprising a primary synchronization signal (PSS), a secondary synchronization signal (SSS), a demodulation reference signal (DMRS), and a physical broadcast channel (PBCH), wherein the control channel transmission is transmitted by a base station over a first set of directional beams corresponding to the set of occasions;

monitor a plurality of occasions of the set of occasions for the control channel transmission, the plurality of occasions corresponding to a plurality of directional beams of the first set of directional beams;

receive, in at least one of the plurality of occasions, the synchronization signal transmission and the control channel transmission from the base station, the control channel transmission comprising paging group information for the paging group;

select, by the apparatus, at least one directional beam of a second set of directional beams for transmitting a paging response based at least in part on the at least one of the plurality of occasions used to receive the control channel transmission and on a received signal strength of the control channel transmission;

transmit, to the base station, the paging response on the selected at least one directional beam; and determine, based at least in part on the paging group information and the identified uplink resources selected at least one directional beam of the second set of directional beams, transmission resources to monitor for a data channel transmission that includes paging information for at least one user equipment (UE) in the paging group.

29. An apparatus for wireless communication, comprising:
a processor;
memory in electronic communication with the processor; and
instructions stored in the memory and operable, when executed by the processor, to cause the apparatus to:
identify a paging group that includes a plurality of user equipments (UEs), wherein one or more UEs of the plurality of UEs are to receive paging information;
identify, for the paging group, a control channel monitoring configuration comprising a set of occasions for reception of a control channel transmission;
frequency division multiplexing or time division multiplexing the control channel transmission with a synchronization signal transmission comprising a primary synchronization signal (PSS), a secondary synchronization signal (SSS), a physical broadcast channel (PBCH), and a demodulation reference signal (DMRS) corresponding to the PBCH;
transmit, based at least in part on the control channel monitoring configuration, the synchronization signal transmission and the control channel transmission over a first set of directional beams, the control channel transmission comprising paging group information providing an indication of a data channel transmission to include the paging information for the one or more UEs;
receive, from a UE of the plurality of UEs, a paging response over at least one directional beam of a second set of directional beams; and
select downlink resources to transmit the data channel based at least in part on the at least one directional beam of the second set of directional beams used to receive the paging response and a received signal strength of the control channel transmission.

* * * * *